United States Patent
Cao et al.

(10) Patent No.: US 11,303,397 B2
(45) Date of Patent: Apr. 12, 2022

(54) HARQ FEEDBACK AND RETRANSMISSION MECHANISM FOR SIDELINK TRANSMISSION

(71) Applicant: Huawei Technologies Co., Ltd., Shenzhen (CN)

(72) Inventors: Yu Cao, Kanata (CA); Amine Maaref, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 25 days.

(21) Appl. No.: 16/841,823

(22) Filed: Apr. 7, 2020

(65) Prior Publication Data

US 2020/0322100 A1  Oct. 8, 2020

Related U.S. Application Data

(60) Provisional application No. 62/830,994, filed on Apr. 8, 2019.

(51) Int. Cl.
*H04L 1/18* (2006.01)
*H04W 72/04* (2009.01)

(52) U.S. Cl.
CPC .......... *H04L 1/1893* (2013.01); *H04W 72/04* (2013.01)

(58) Field of Classification Search
CPC ...... H04L 1/893; H04L 5/0055; H04W 72/04; H04W 72/02; H04W 72/042; H04W 92/18
See application file for complete search history.

(56) References Cited

U.S. PATENT DOCUMENTS

| | | | |
|---|---|---|---|
| 10,382,169 B2 | 8/2019 | Cao et al. | |
| 2017/0019910 A1 | 1/2017 | Seo | |
| 2017/0289733 A1* | 10/2017 | Rajagopal | H04W 4/70 |
| 2017/0359835 A1 | 12/2017 | Seo et al. | |
| 2018/0014251 A1* | 1/2018 | Sambhwani | H04L 5/0055 |
| 2019/0229853 A1* | 7/2019 | Lee | H04W 24/08 |

FOREIGN PATENT DOCUMENTS

CN    107710705 A    2/2018

OTHER PUBLICATIONS

"Feature lead summary for AI 7.2.4.3: Uu-based sidelink resource allocation/configuration", 3GPP TSG RAN WG1 Meeting AH-1901, Taipei, Jan. 21-25, 2019, 11 pages.
Huawei et al. "Handling of retransmission with a different size in DL HARQ operation", 3GPP TSG-RAN WG2 Meeting 101bis R2-1805784, Apr. 20, 2018, 2 pages.

\* cited by examiner

*Primary Examiner* — Jamal Javaid
(74) *Attorney, Agent, or Firm* — Slater Matsil, LLP

(57) ABSTRACT

Systems and methods for early termination of feedback in respect of sidelink transmissions are provided. A first UE transmits at least one sidelink (SL) transmission of a first set of SL transmissions to a second UE, the first set of SL transmissions comprising an initial SL transmission and a set number of SL retransmissions. If no ACK is received, then the first UE transmits the set number of retransmissions. On the other hand, if an ACK is received, then the first UE transmits fewer than the set number of SL retransmissions when an ACK is received from the second UE before the set number of SL retransmissions has been completed. By transmitting fewer than all of the set number of SL retransmissions, resources can be freed up for other purposes. The approach may be used for SL configured grant transmission.

20 Claims, 13 Drawing Sheets

HARQ FEEDBACK AND RETRANSMISSION MECHANISM FOR SIDELINK TRANSMISSION

CROSS REFERENCE TO RELATED APPLICATIONS

This application claims the benefit of U.S. Provisional Patent Application No. 62/830,994 filed Apr. 8, 2019, which is hereby incorporated by reference.

FIELD

The disclosure relates to hybrid automatic repeat request (HARQ) feedback and retransmission mechanisms for sidelink transmissions.

BACKGROUND

Vehicle to everything (V2X) refers to a category of communications scenarios (along with their corresponding technical challenges), including communication between a vehicle and another vehicle (V2V), vehicle to infrastructure (V2I), vehicle to pedestrian (V2P), and many other scenarios. In V2X, the transmission can be done through a link between network and user equipment (UE), such as uplink (UL) and downlink (DL) or a sidelink between UE and UE (SL).

A SL transmission may use transmission resources that are dynamically granted by a base station. Alternatively, the transmission resources may be semi-statically configured by a base station so that UE devices can communicate in a "grant-free" manner. A grant-free transmission is also known as a "configured grant transmission" or a "transmission without dynamic scheduling."

SL transmissions, both grant-based and grant-free, may benefit from a feedback procedure to indicate whether an SL transmission was successfully received. Feedback, such as HARQ acknowledgement (ACK) or negative acknowledgement (NACK) is transmitted in a feedback channel, such as a physical sidelink feedback channel (PSFCH) associated with a physical sidelink shared channel (PSSCH). Improved SL HARQ procedures are generally desired.

SUMMARY

According to one aspect of the present disclosure, there is provided a method in a first user equipment (UE), the method comprising: the first UE transmitting at least one sidelink (SL) transmission of a first set of SL transmissions to a second UE, the set of SL transmissions comprising an initial SL transmission and a plurality of SL retransmissions; before transmitting a last SL retransmission of the plurality of SL retransmissions, the first UE receiving an acknowledgement (ACK) from the second UE, the first UE terminating the transmission of the first set of SL transmissions in response to receiving the ACK by refraining from transmitting at least the last SL retransmission of said plurality of SL retransmissions.

According to another aspect of the present disclosure, there is provided a method in a first user equipment (UE), the method comprising: the first UE transmitting at least one sidelink (SL) transmission of a first set of SL transmissions to a second UE, the first set of SL transmissions comprising an initial SL transmission and a set number of SL retransmissions; wherein transmitting at least one SL transmission comprises: transmitting the set number of SL retransmissions when no ACK is received from the second UE; transmitting fewer than the set number of SL retransmissions when an ACK is received from the second UE before the set number of SL retransmissions has been completed.

Optionally, transmitting the initial transmission comprises transmitting a sidelink control information and transmitting an initial transmission of a SL data; wherein the sidelink control information indicates resources for the first set of SL transmissions.

Optionally, the method further comprises: receiving a configuration of a resource pool; the first UE selecting resources for the first set of SL transmission from among the resource pool.

Optionally, the first set of SL transmissions is an SL CG transmission.

Optionally, the method further comprises: receiving a configuration of a maximum number of transmissions and retransmissions of a TB that UE can perform using the resources configured by the SL CG transmission.

Optionally, a set of periodic physical resources is available for the second UE to transmit the ACK, and wherein the ACK is received using a first available resource from the set of periodic physical resources that occurs later by at least a defined time gap than a time of successful reception of one of the SL retransmissions by the second UE.

Optionally, transmitting fewer than all of the first set of SL transmissions when an ACK is received from the second UE before all of the first set of SL transmissions has been completed comprises: transmitting fewer than all of the set of SL transmissions when an ACK is received that is associated with the initial SL transmission or one of a first M-1 of the plurality of SL retransmissions, where M is an integer.

Optionally, each of the at least one sidelink (SL) transmission is a groupcast transmission to a group of UEs inclusive of the second UE; the method further comprising: transmitting all of the first set of SL transmissions when no ACK is received from at least one of the group of UEs; transmitting fewer than all of the first set of SL transmissions when an ACK is received from all of the group of UEs before all of the first set of SL transmissions has been completed.

Optionally, the method further comprises: receiving from a network device a configuration of resources for the first set of SL transmissions; using the configuration of resources to make the first set of SL transmissions.

Optionally, the configuration is received by radio resource control (RRC) signaling.

Optionally, the configuration is received by downlink control information (DCI).

According to another aspect of the present disclosure, there is provided a user equipment comprising: a processor; a memory; at least one antenna; wherein the UE is configured to perform a method comprising: the UE transmitting at least one sidelink (SL) transmission of a first set of SL transmissions to a second UE, the first set of SL transmissions comprising an initial SL transmission and a set number of SL retransmissions; wherein transmitting at least one SL transmission comprises: transmitting the set number of SL retransmissions when no ACK is received from the second UE; transmitting fewer than the set number of SL retransmissions when an ACK is received from the second UE before the set number of SL retransmissions has been completed.

Optionally, transmitting the initial transmission comprises transmitting a sidelink control information and transmitting an initial transmission of a SL data; wherein the sidelink control information indicates resources for the first set of SL transmissions.

Optionally, the UE is further configured to: receive a configuration of a resource pool; select resources for the first set of SL transmission from among the resource pool.

Optionally, the first set of SL transmissions is an SL CG transmission.

Optionally, UE is further configured to: receive a configuration of a maximum number of transmissions and retransmissions of a TB that UE can perform using the resources configured by the SL CG transmission.

Optionally, a set of periodic physical resources is available for the second UE to transmit the ACK, and wherein the ACK is received using a first available resource from the set of periodic physical resources that occurs later by at least a defined time gap than a time of successful reception of one of the SL retransmissions by the second UE.

Optionally, transmitting fewer than all of the first set of SL transmissions when an ACK is received from the second UE before all of the first set of SL transmissions has been completed comprises: transmitting fewer than all of the set of SL transmissions when an ACK is received that is associated with the initial SL transmission or one of a first M-1 of the plurality of SL retransmissions, where M is an integer.

Optionally, each of the at least one sidelink (SL) transmission is a groupcast transmission to a group of UEs inclusive of the second UE; the user equipment further configured to: transmitall of the first set of SL transmissions when no ACK is received from at least one of the group of UEs; transmit fewer than all of the first set of SL transmissions when an ACK is received from all of the group of UEs before all of the first set of SL transmissions has been completed.

Optionally, the user equipment is further configured to receive from a network device a configuration of resources for the first set of SL transmissions; use the configuration of resources to make the first set of SL transmissions.

Optionally, the configuration is received by radio resource control (RRC) signaling.

Optionally, the configuration is received by downlink control information (DCI).

Optionally, the first UE receiving an acknowledgement (ACK) from the second UE comprises: the first UE receiving the ACK with sufficient time to terminate the transmission of the set of transmissions by refraining from transmitting at least the last SL transmission of the plurality of SL transmissions.

Optionally, the ACK is associated with the initial SL transmission or one of the plurality of SL retransmissions in that physical resources of the ACK are related to time and frequency resources of the successful SL transmission.

Optionally, that physical resources of the ACK are related to time and frequency resources of the successful SL transmission through one of: table lookup; mathematical relationship; through a configured or predefined time gap between the ACK and the successful SL transmission.

Optionally, receiving an ACK being associated with a successful SL transmission, the successful SL transmission being the initial SL transmission or one of the plurality of SL retransmissions comprises: receiving an ACK associated with the initial SL transmission or one of a first M-1 of the plurality of SL retransmissions, where M is configured by a base station or preconfigured.

Optionally, the method further comprises: receiving a plurality of ACKs including a respective ACK associated with the first set of SL transmissions from each UE of a group of UEs inclusive of receiving the ACK from the second UE; wherein the ACK received from the second UE is a last one of the plurality of ACKs; wherein the first UE terminating the transmission of the first set of SL transmissions in response to receiving the ACK comprises the first UE terminating the transmission of the first set of SL transmissions in response to receiving all of the plurality of ACKs.

Optionally, the method further comprises: the first UE transmitting an initial SL transmission of a set of SL transmissions using SL resources freed by early terminating the transmission of the first set of SL transmissions.

According to another aspect of the present disclosure, there is provided a method in a first user equipment (UE), the method comprising: the first UE receiving at least one sidelink (SL) transmission of a set of SL transmissions from a second UE, the set of SL transmissions comprising an initial SL transmission and a plurality of SL retransmissions; prior to receiving a last SL retransmission of the plurality of SL retransmissions, the first UE transmitting an acknowledgement (ACK) to the second UE, the ACK being associated with a successful SL transmission, the successful SL transmission being the initial SL transmission or one of the plurality of SL retransmissions.

Optionally, the ACK is associated with the initial SL transmission or one of the plurality of SL retransmissions in that physical resources of the ACK are derived from time and frequency resources of the successful SL transmission.

Optionally, transmitting an ACK being associated with a successful SL transmission, the successful SL transmission being the initial SL transmission or one of the plurality of SL retransmissions comprises: transmitting an ACK associated with the initial SL transmission or one of a first M-1 of the plurality of SL retransmissions, where M is configured by a base station or preconfigured.

Optionally, the method further comprises: the first UE receiving at least one transmission of a second set of SL transmissions, the second set of SL transmissions comprising an initial SL transmission and a plurality of SL retransmissions that are made automatically without being triggered by HARQ feedback; the first UE transmitting an ACK associated with a successful SL transmission for the second set of SL transmissions only when the successful SL transmission is the initial SL or one of the first M-1 retransmissions Optionally, the method further comprises: the first UE receiving an initial SL transmission of a second set of SL transmissions using SL resources freed by early terminating the transmission of the first set of SL transmissions.

Optionally, prior to receiving a last SL retransmission of the plurality of SL retransmissions, the first UE transmitting an acknowledgement (ACK) to the second UE comprises: transmitting the ACK when the second UE will receive the ACK with a sufficient amount of time to terminate the transmission of the first set of SL transmissions by refraining from transmitting at least the last SL transmission of the plurality of SL retransmissions.

Optionally, prior to receiving a last SL retransmission of the plurality of SL retransmissions, the first UE transmitting an acknowledgement (ACK) to the second UE, ACK being associated with a successful SL transmission, the successful SL transmission being the initial SL transmission or one of the plurality of SL retransmissions comprises: transmitting the ACK when the following inequality holds:

$$T1+T3<T2$$

where T2 is a time gap between the last two transmissions for the first TB, T1 is a feedback time gap, and T3 is a time for the second UE to process a received ACK.

Optionally, the first UE receiving at least one transmission of the first set of SL transmissions comprises receiving a unicast transmission or a groupcast transmission.

According to another aspect of the present disclosure, there is provided a method in a first user equipment (UE), the method comprising: the first UE receiving at least one sidelink (SL) transmission of a set of SL transmissions from a second UE, the set of SL transmissions comprising an initial SL transmission and a plurality of SL retransmissions; in response to each received SL transmission, the first UE determining whether to transmit an acknowledgement (ACK) when the received SL transmission is decoded successfully based on one or a combination of two or more of: a number of transmissions of the plurality of SL retransmissions received by the first UE; a time gap between the received SL transmission and a last SL transmission of the plurality of transmissions; a processing time for to the second UE to process the ACK feedback.

Optionally, in response to each received SL transmission, the first UE further determines whether to transmit a negative acknowledgement (NACK) when the received SL transmission is not decoded successfully.

According to another aspect of the present disclosure, there is provided a user equipment comprising: a processor; a memory; at least one antenna; wherein the user equipment is configured to perform the method as summarized above.

BRIEF DESCRIPTION OF THE DRAWINGS

Embodiments of the disclosure will now be described with reference to the attached drawings in which.

DETAILED DESCRIPTION

Figure 1A:
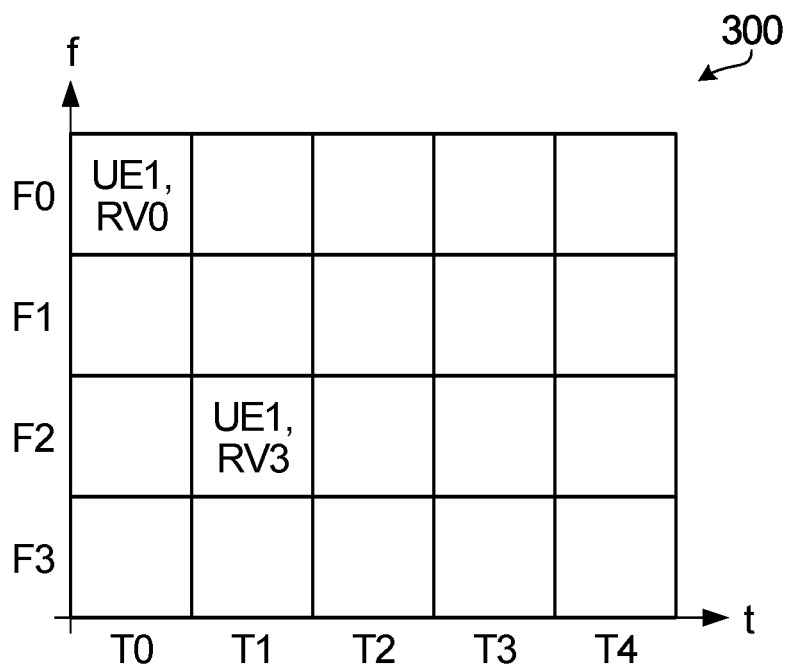
FIG. 1A is a block diagram illustrating an example of a two-dimensional resource configuration for grant-free SL transmission.

A sidelink transmission of a discrete amount of information (e.g., a transport block) may include a retransmission procedure performed by a transmit UE to improve the reliability of the sidelink transmission. In some embodiments of the present disclosure the retransmission may be a blind retransmission, which refers to a retransmission of an initial transmission that is not triggered by HARQ feedback or a new scheduling grant. A blind retransmission may also be known as a repetition.

In NR, there are two SL transmission modes. In mode 1, the BS controls SL transmission. Mode 1 is most suitable for in coverage UE.

Mode 1—dynamic scheduling sub-mode—the network dynamically schedules SL transmissions. In this dynamic scheduling sub-mode, BS may send a DCI to the transmitter UE to schedule the SL transmission. The transmit UE follows the scheduling grant in the DCI and sends a SL transmission to the receive UE or receive UEs.

Mode 1—CG Type 1—also known as grant-free transmission: the configured grant resource is semi-statically configured by RRC signaling (which may include a RRC configured grant). The UE uses the configured resource without dynamic signaling (e.g. DCI) to perform SL transmissions.

Mode 1—CG Type 2: The configured grant resource is configured by RRC signaling and DCI signaling. In type 2 CG, transmit UE may receive some configuration in RRC signaling and then the transmit UE may further receive a DCI activation signal.

In Mode 2 configured grant or GF transmission, the GF resource may be preconfigured or configured by RRC or system information. Mode 2 can be used for both in coverage and out of coverage UEs. In mode 2, a UE determines or selects a resource among a (pre-) configured resource pool.

In Type 1 SL configured grant (CG) configuration, the resource is configured semi-statically or preconfigured without dynamic signaling in DCI. In one variant, the SL data transmission on PSSCH according to CG does not have an associated SCI or PSCCH or there is an associated SCI or PSCCH transmission but it does not include any scheduling information or indication in a SCI. In another variant, a SCI or PSCCH is transmitted along with SL data or PSSCH transmission. The SL CG configuration may be configured within a RP or configured without a RP.

In some embodiments, a SL CG configuration involves indicating a resource from a resource pool that is configured or preconfigured. Alternatively, SL CG configuration involves configuring a resource pool from which the UE can select from. The resource pool configuration may be also used to define a resource pool for other transmission modes or just an independent SL CG configuration.

A resource pool refers to a pool of transmission resources that a UE can use or select from. A resource pool typically includes at least the time and frequency resources. Resource pool can include other transmission resources.

SL CG configuration defined within the RP, there may be other transmission modes defined within the RP as well. In another example, there are multiple SL CG configurations, which may be configured per SL BWP. For each SL GF configuration, there may be one or multiple resource pools defined, each resource pool can be a transmit resource pool or receive resource pool. In some scenarios, the resource configuration for each SL GF configuration may not be called a resource pool or within a resource pool, it may be simply a resource configuration.

In some embodiments, a UE is configured with multiple SL CG configurations, which may be defined within multiple SL bandwidth parts (BWPs). SL BWPs may be configured within RRC configuration (UE specific SL BWP), in system information (common SL BWP) or reconfiguration (preconfigured SL BWP). In some embodiments, a UE reuses one or more UL BWPs as SL BWPs.

In some embodiments, a UE may have multiple resource pool configurations and/or multiple SL CG configurations. Multiple transmit and receive resource pool configurations and/or multiple SL CG configurations may be configured per SL-BWP.

In some embodiments, multiple SL CG configurations may be configured within resource pool configurations. In some embodiments, multiple transmit and receive resource pools may be configured within SL CG configurations.

In some embodiments, multiple SL CG configurations may be independent of resource pool configurations.

Each SL GF configuration may include one or more of transmit resource or resource pool and receive resource or resource pool. The configuration can be semi-static or semi-persistently configured, the example of configuration signaling can include RRC, system information block (SIB), preconfigured, or a combination of RRC and SIB.

Each SL CG configuration may include parameters for one or multiple transmit SL CG configurations and/or parameters for one or multiple receive SL CG configurations. Parameters for each transmit SL CG configuration may include one or multiple sets of parameters, each set including one or a combination of:

Time and frequency resources, periodicity, pattern window length, frequency sub-channel definition, location of SCI, (initial) transmission pattern and/or transmission pattern pool, frequency hopping parameters, MCS or MCS pool, DMRS or DMRS pool, repetition K, HARQ process related parameters, feedback channel parameters and optionally Destination ID or destination group ID Parameters for each receive SL CG configuration may include one or multiple sets of parameters, each set including one or a combination of:

Time and frequency resources, periodicity, pattern window length, frequency sub-channel definition, location of SCI, (initial) transmission pattern and/or transmission pattern pool, frequency hopping parameters, MCS or MCS pool, DMRS or DMRS pool, repetition K, HARQ process related parameters, feedback channel parameters and optionally source ID or source group ID The time domain resource configuration may include optionally a periodicity, optionally an offset (also referred to as starting slot), transmission pattern, repetition number (K), RV sequence for repetition, and optionally length of the transmission pattern etc. . . . . Transmission pattern in the time domain may be indicated using a bitmap indicating which time slot can be used for the UE to transmit SL data.

The frequency domain resource configuration may include, for example, the active Bandwidth part (BWP) used for SL transmission and subchannels/Resource block group (RBG) of the BWP. In some embodiments, the frequency domain configuration may first indicate the starting RB of the first frequency sub-channel (RB_{start}), number of RBs per frequency subchannel (N_{RB_in_subchannel}), and the total number of frequency sub-channels (n_{subchannel}) available for the SL transmission. The above parameters can be used to determine the range and partition of frequency subchannels. For example, in a resource grid as shown in in FIG. 1A described in detail below, the above parameters (starting RB of F0, number of frequency sub-channels is 4 and the number of RBs per sub-channel is the number of RBs in F0) can define the frequency location and size for F0 to F4. The above parameters can be UE specifically indicated (e.g. in RRC) or can be broadcast in system information for multiple UEs. The frequency domain configuration may then indicate the index of the frequency subchannel m to be used for the transmission. UE may then determine its frequency allocation corresponds to the RB that starts at RB index RB_{start}+ m*N_{RB_in_subchannel} and with n_{subchannel} number of continuous RBs to be use. In the case, a transmission pattern bitmap is determined in time domain and different subchannels may be used in frequency domain for different repetitions of the TB, the frequency domain configuration may further indicate the frequency index for each transmission/repetition of the TB. For example, in case of the example shown in FIG. 1A, F0 to F4 may corresponds index m as 0, 1, 2, 3, respectively, and the frequency domain resource configuration may indicate a frequency channel index sequence corresponding to each transmission of the TB, which is {0, 2}, corresponding to F0 and F2 for first and second transmission of the TB. In some embodiment, the resource assigned to each PSSCH transmission may include more than 1 subchannel in the frequency domain. In this scenario, in addition to indicating the above definition of subchannel, the resource configuration may further include the starting subchannel index and the number of subchannels used for each PSSCH transmission. The starting subchannel index and the number of subchannels used can be individually defined for each repetition. Alternatively, the number of subchannels used for each repetition may be the same and only the starting subchannel index need to be signaled for each repetition. In another embodiment, the starting subchannel index may be defined for just the initial transmission, the starting subchannel index for the rest of the repetition can be the same as the initial transmission or determined by the starting subchannel index along with frequency hopping parameters or through frequency domain pattern indication.

If a SL control channel is defined, the time and frequency domain resource configuration for the SL control channel PSCCH (or scheduling assignment (SA)) may share the same above configuration for SL data channel or have their own separate configuration.

Time frequency resources may include the number of sub-channels used for each SL data or physical sidelink shared channel (PSSCH) transmission (which may be referred to as a PSSCH partition). The definition of subchannel may include size of subchannel (e.g. in resource blocks), and/or number of subchannels in frequency domain. The location of sidelink control channel (SCI) can be signaled in different methods. In some embodiment, the pool of all SCI location (also named PSCCH pool) may be defined first in the resource pool and then the exact location of SCI can be further defined in the SL CG configuration. In one example, if PSCCH is not transmitted in adjacent RBs with PSSCH, the PSCCH pool is a separate region in frequency domain next to the frequency subchannels used for data transmission. Each SCI corresponding to each data frequency channel is equal size. Therefore, once the PSCCH pool is defined, e.g. through signaling the starting RB of PSCCH pool and the number of RBs used for SCI in frequency domain, UE can derive the location of SCI. In some embodiment, the number of RBs used in SCI is predetermined without signaling. In another scenario, SCI is always at fixed location with respect to the PSSCH transmission (e.g. 2 RBs for each slot transmission next to the PSSCH transmission). In both cases, a UE will be able to know where to detect SCI, either based on some default rule, or through configuration. Periodicity indicates the time duration between two neighboring GF resource or resource bundle that repeats over time. Here resource bundle refers to multiple PSSCH resources defined in a pattern. In some embodiments, the pattern is used for multiple repetitions of a TB. In some embodiments may allow the use of the resource pattern for transmission of different TBs. The pattern window length is the time domain length of which each transmission pattern is defined within.

Figure 2:
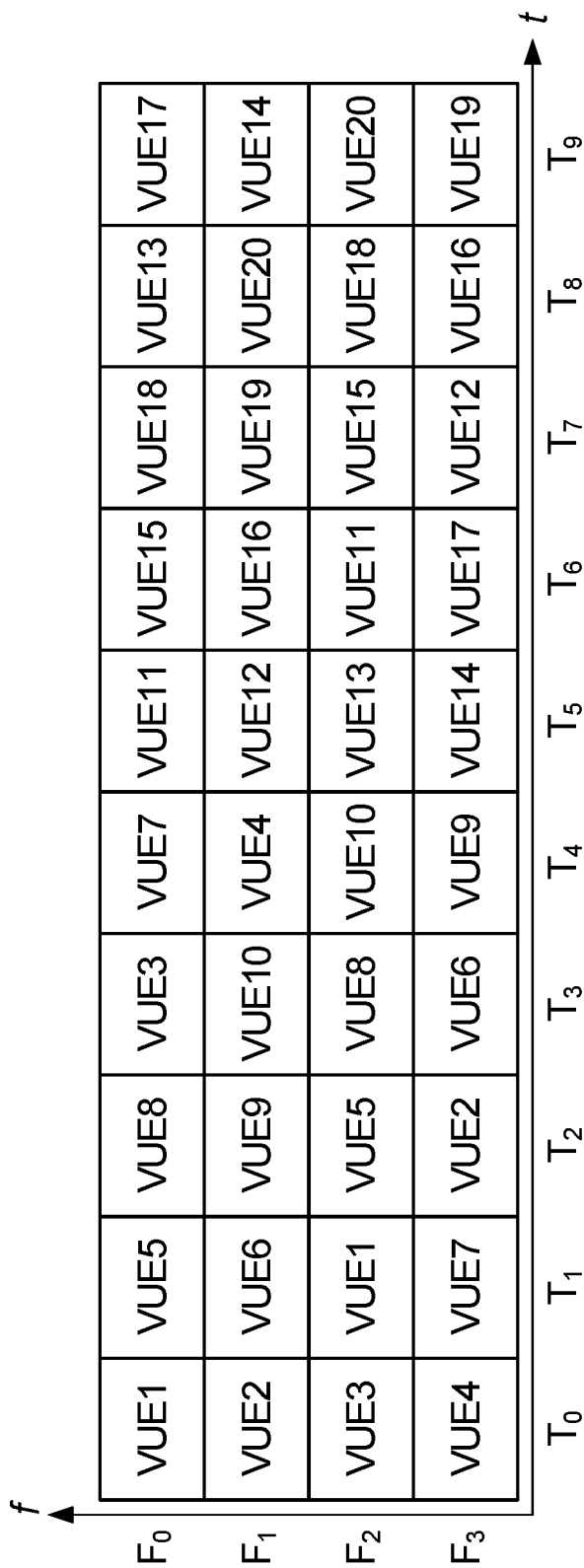
FIG. 2 is a specific example of time frequency parameters, definition of subchannnels, transmit pattern etc.

FIG. 2 shows a specific example of time frequency parameters, definition of subchannnels, transmit pattern etc. With this example, time is on the horizontal axis and frequency is on the vertical axis. Frequency is divided into four; each division is the frequency partition for one PSSCH transmission in frequency domain, which may be one or multiple resource blocks. Each frequency partition may be one subchannnel or multiple subchannels. The number of RBs and starting RBs for each frequency subchannel may be determined from the resource configuration or definition of resource pool or pattern pool. The number of subchannels used for each PSSCH transmission in the frequency domain in the case when multiple subchannels can be used may also be signaled in the resource configuration. Time is shown divided into ten time units; each division is the size of PSSCH transmission in the time domain, and may be one or multiple OFDM symbols. Each division can be a slot. A transmit pattern is made up of multiple blocks of time frequency resources. For example, the pattern labelled UE1 has a block in F0,T1, and another block in F2,T2. Shown are 19 patterns within the depicted resource. Note that in the pattern shown below, T0 to T4 shows a pattern window, within which the non-overlap pattern of VUE 1 to VUE 10 is defined. 10 new patterns for another different 10 UEs (VUE11-VUE20) are defined in T5-T9, which is a repetition of the 10 patterns defined in T0-T4. The 20 patterns defined within the pattern grid shown in the figure may be repeated over time for VUE1 to VUE 20, i.e., VUE1 to VUE20 may be configured a new pattern of two resources every 10 time units. Use 1 time unit (T0) equals 1 slot as an example, in the example pattern pool defined in the following figure, the pattern window length=5 slot and periodicity=10 slots.

In some embodiments, the transmission pattern indicates a number of "on" or usable resources within the time window of the transmission pattern. In a time-frequency based transmission pattern, for example, the UE transmits using time-frequency communication resources in time slots that are designated as "on" time slots by the transmission pattern, and receives in time slots that are not designated as "on" time slots (or are otherwise designated as "off" time slots) by the transmission pattern. In this sense, a transmission pattern could be considered a form of "on-off" pattern in some embodiments.

The transmission pattern (or, in some embodiments, the on-off pattern) may define the resources used for a number of transmissions of a transport block (TB). The transmissions may include the initial transmission and retransmissions of the same TB. The initial transmission and retransmission of the TB may sometimes also be referred to as repetitions. In some embodiments, each transmission pattern may represent transmissions of one transport block (TB), i.e., a UE should start initial transmission of a TB at the first "on" slot in the transmission pattern, and continue repetition of the TB on all the "on" slots until the end of the "on" slots defined by the transmission pattern. In this type of application, a transmission pattern (or on-off pattern) could be considered a repetition pattern. In some embodiments, a UE may also listen to other UE's transmissions in the "off" slots defined by the transmission pattern or any slot that is not defined as an "on" slot in the transmission pattern.

In some embodiments, a UE is configured to use a transmission pattern defining or otherwise indicating communication resources that are allotted or allocated to the UE over a specific time interval for SL communications. Other UEs are similarly configured to use respective transmission patterns over this time interval. A UE can transmit and receive SL transmissions within a time interval using these communication resources according to its transmission pattern. A half-duplex UE might still be transmitting at certain times while other UEs are transmitting, but transmission patterns could be designed to provide an opportunity for each UE to receive SL transmissions from all other UEs at least once during the time interval if all UEs are configured and transmitting during the time interval using their respective transmission patterns.

Time is one dimension that may be used in defining communication resource usage in a transmission pattern. Other dimensions, such as frequency, code, and/or signature are also contemplated.

Transmission patterns may belong to a transmission pattern set or pool that is common to a group of UEs. RRC signaling may be used to configure the transmission pattern for a UE and/or a transmission pattern pool. Transmission pattern pool may also be signaled by broadcast signaling (e.g. in SIB).

FIG. 1A is a block diagram illustrating an example of a two-dimensional resource configuration for grant-free SL transmission. This is an example of a transmission pattern. FIG. 1 illustrates a resource grid 300, which includes frequency-domain resources F0, F1, F2 and F3, and time-domain resources T0, T1, T2, T3 and T4. Each combination of frequency-domain resource and time-domain resource forms a communication resource for SL transmission. FIG. 1A also illustrates a transmission pattern for a UE1. Resource grid 300 indicates a time-frequency communication resource for two transmissions by UE1, as well as a redundancy version (RV) (RV0 or RV3) in a label on each communication resource.

In FIG. 1A, UE1 is configured with a transmission pattern, which explicitly defines the transmission repetition number as well as the communication resources for each repetition. Each repetition may also be associated with an RV, which can be predefined or preconfigured (e.g. configured using a UE specific RV sequence indicating the associated RV for each repetition). A single UE index is used to indicate both time-domain and frequency-domain resources in FIG. 1A. In general, a UE index corresponds to a specific UE or a UE group. The communication resources assigned to UE1 form the transmission pattern for UE1.

The resource grid 300 has a frequency-domain length of 4 and a time-domain length of 5. In the time-domain, T0 to T4 could be slots, mini-slots, symbols, or any other quantization or unit of time. In the frequency-domain, F0 to F3 could be frequency sub-channels, combinations of sub-channels, resource blocks, resource block groups (RBGs), bandwidth parts (BWPs), subcarriers, a number of subcarriers, carriers or any other quantization or unit of frequency. Different frequency domain sub-channels are just an example. Sub-channels can instead be associated with different layers of non-orthogonal multiple access (NOMA), different pilot resources, and/or other resources. Although shown as time-domain resources and frequency-domain resources in FIG. 1A, in general the transmission pattern could also or instead include code-domain resources (such as sparse code multiple access), space-domain resources, and/or different demodulation reference signals (DMRS). Moreover, the transmission patterns are not limited to two-dimensions, and therefore could include a number of dimensions greater or less than two.

In some embodiments, frequency-domain resources, pilots and layer index may be associated with time-domain signatures. For example, as an alternative to using a UE index, the resource grid 300 could indicate only the time-domain signature or time-domain transmission pattern, and other dimensions (e.g. the frequency-domain dimension) may be derived from it.

Figure 1B:
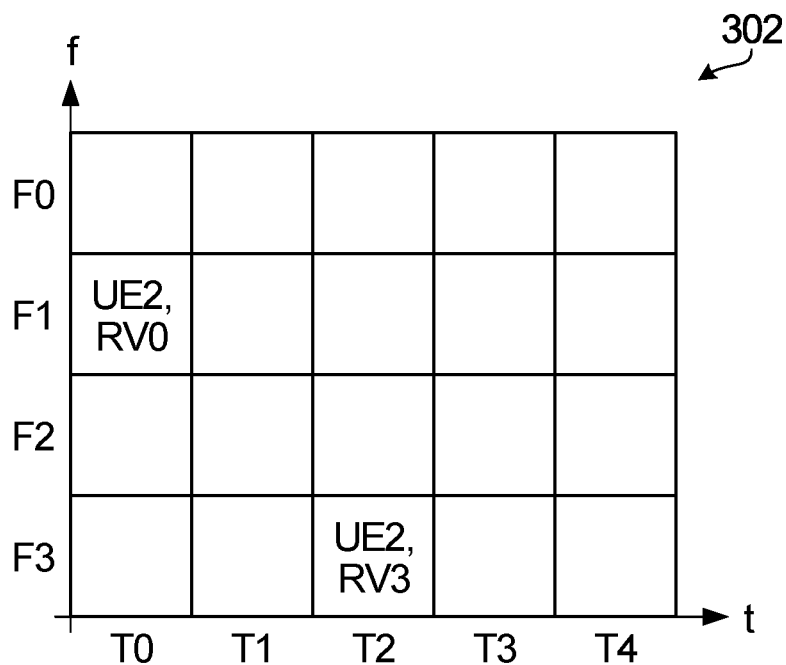
FIGS. 1B-1K are block diagrams illustrating other examples of two-dimensional resource configurations for grant-free SL transmission.
Figure 1C:
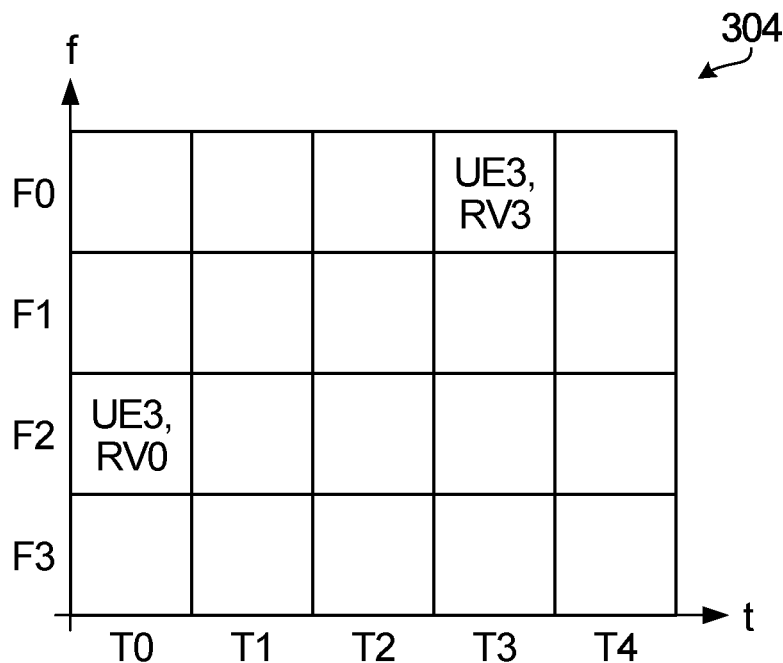
Figure 1D:
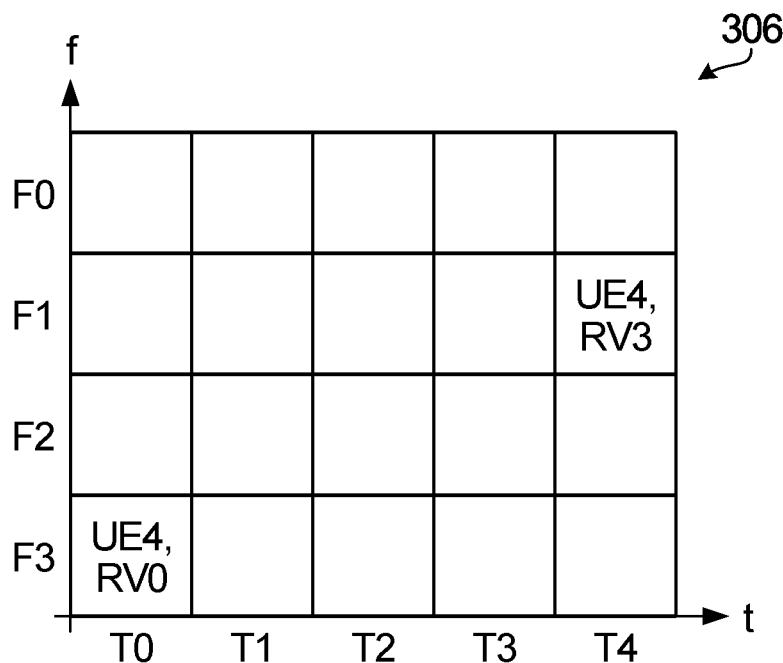
Figure 1E:
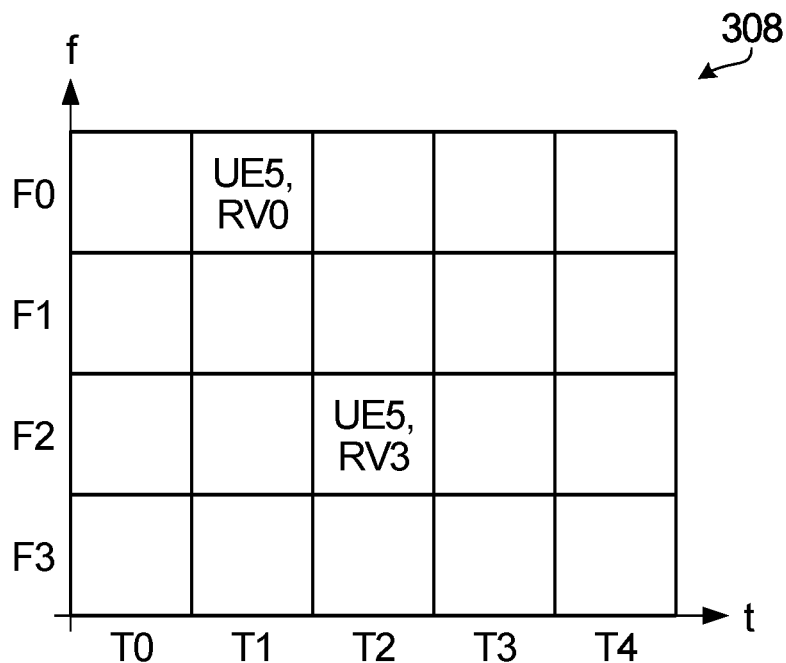
Figure 1F:
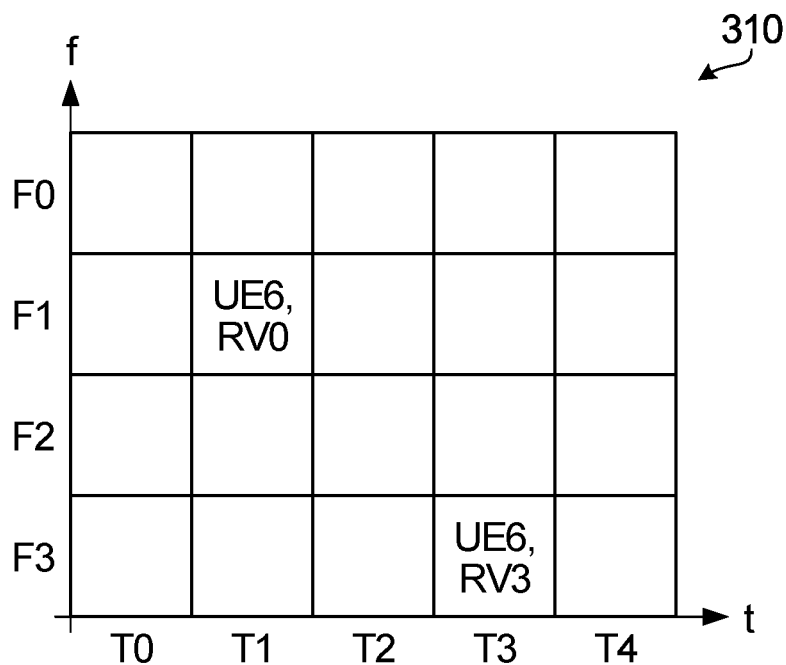
Figure 1G:
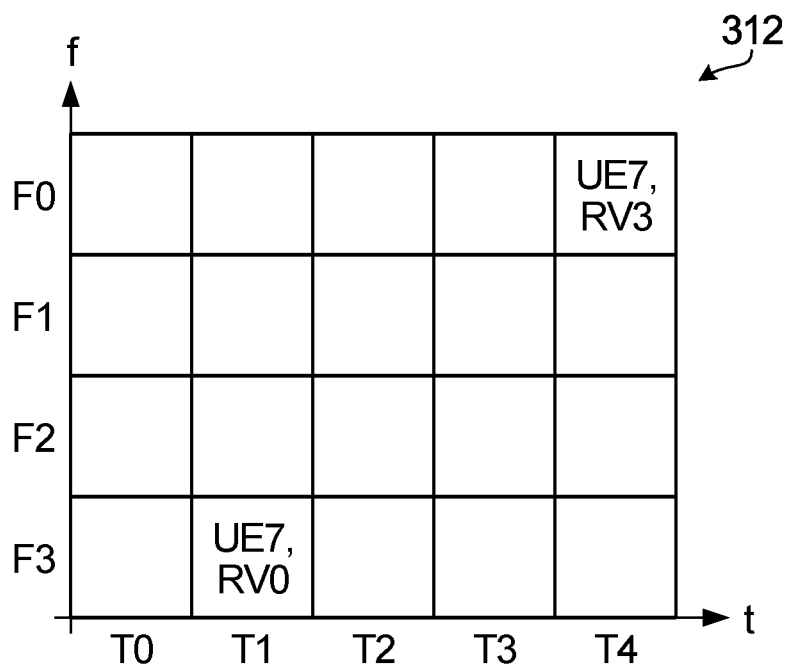
Figure 1H:
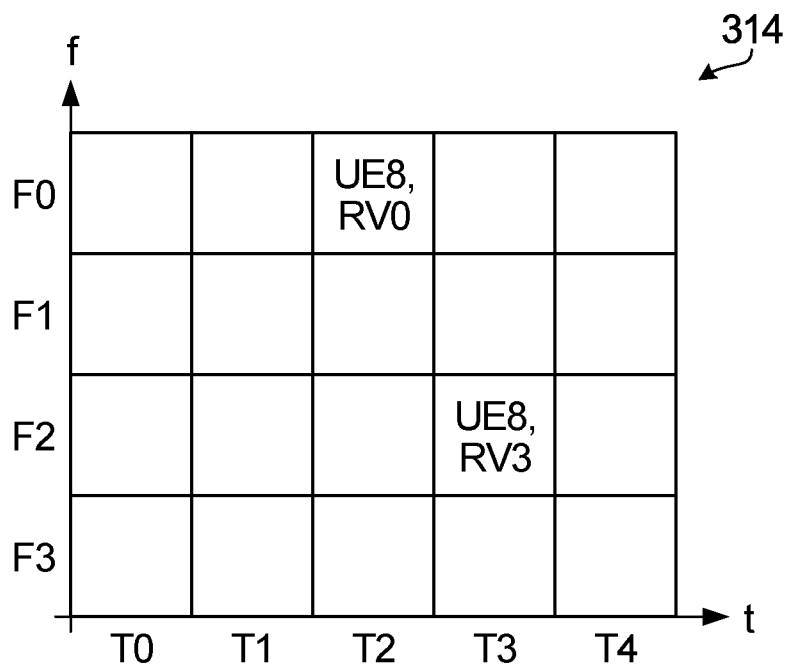
Figure 1I:
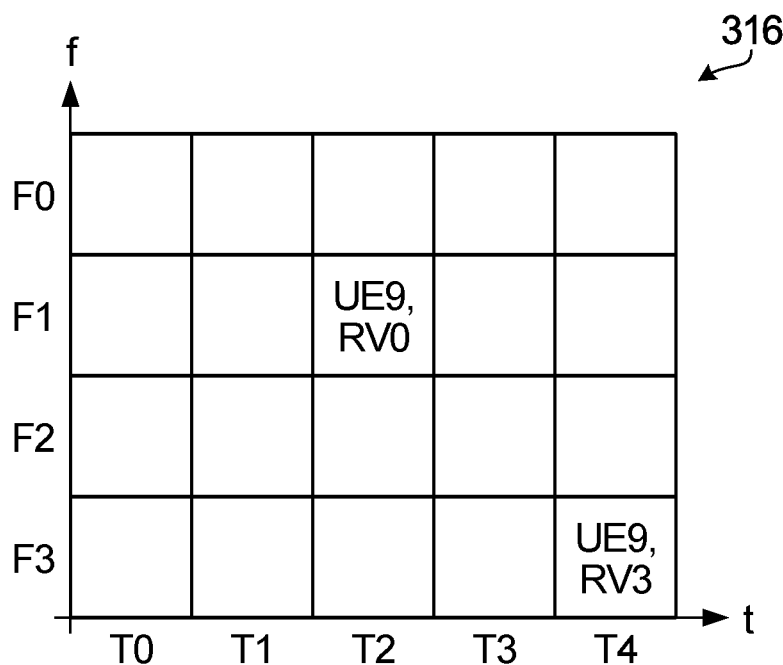
Figure 1J:
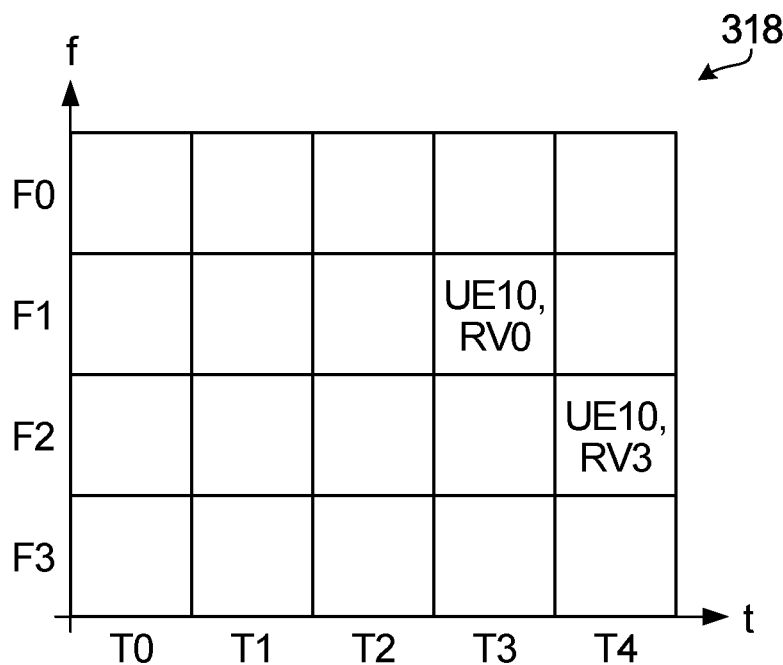

FIG. 1B is another block diagram illustrating an example of a two-dimensional resource configuration for grant-free SL transmission. FIG. 1B illustrates a resource grid 302. Resource grid 302 includes the same frequency-domain resources F0, F1, F2 and F3, and time-domain resources T0, T1, T2, T3 and T4 as resource grid 300 in FIG. 1A. FIG. 1B also illustrates a transmission pattern for UE2.

Resource grid 302 indicates time-frequency communication resources for two transmissions by UE2, as well as a redundancy version (RV0 or RV3) in a label on each communication resource. These time-frequency communication resources define the transmission pattern for UE2. The time-frequency communication resources indicated in resource grid 302 for UE2 are different from the time-frequency communication resources indicated in resource grid 300 for UE1.

FIGS. 1C, 1D, 1E, 1F, 1G, 1H, 1I and 1J are further block diagrams illustrating other examples of two-dimensional resource configurations for grant-free SL transmission. FIGS. 1C, 1D, 1E, 1F, 1G, 1H, 1I and 1J illustrate resource grids 304, 306, 308, 310, 312, 314, 316 and 318, respectively, each resource grid including the same frequency-domain resources F0, F1, F2 and F3, and time-domain resources T0, T1, T2, T3 and T4 as resource grid 300 in FIG. 1A. Resource grids 304, 306, 308, 310, 312, 314, 316 and 318 each indicate communication resources defining the transmission patterns for UE3, UE4, UE5, UE6, UE7, UE8, UE9 and UE10, respectively, as well as a redundancy version (RV0 or RV3) in a label on each communication resource. Each communication resource indicated by resource grids 300, 302, 304, 306, 308, 310, 312, 314, 316 and 318 are unique.

Figure 1K:
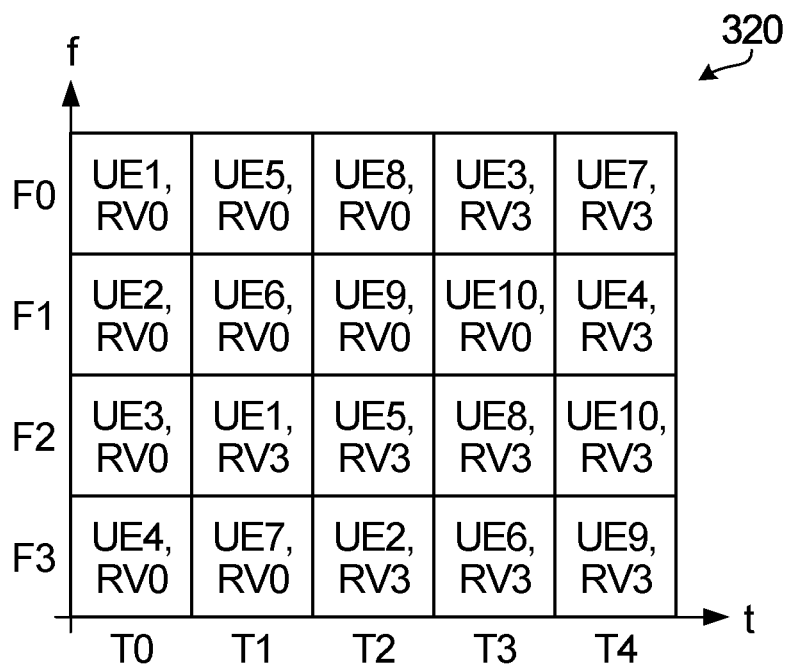

FIG. 1K is yet another block diagram illustrating a two-dimensional resource configuration for grant-free SL transmission. FIG. 1K illustrates resource grid 320, which also includes the same frequency-domain resources F0, F1, F2 and F3, and time-domain resources T0, T1, T2, T3 and T4 as resource grid 300 in FIG. 1A. Resource grid 120 is a superposition of resource grids 300, 302, 304, 306, 308, 310, 312, 314, 316 and 318. Therefore, resource grid 320 may be considered to indicate a transmission pattern pool, which includes the transmission patterns for UE1-UE10.

The communication resources illustrated in FIG. 1K are used for SL transmission by respective UEs, according to their transmission patterns. In general, each communication resource represents a potential transmission of a transport block (TB). The same TB is used in each transmission by a UE over the length of a transmission pattern. In FIG. 1K, according to their respective transmission patterns, each UE transmits a TB twice over the length of the configured transmission pattern, therefore the repetition number of each transmission pattern is 2. As explained below, this allows each UE receive at least one transmission of the TB by the other UEs.

For transmission, each UE may be configured one or multiple sets of transmit parameters. Each set of transmit parameters may include time/frequency location, periodicity, frequency sub-channel definition, DMRS/preamble, transmission pattern, SCI location, MCS, repetition K, HARQ process related parameters, feedback channel, and in some embodiments destination ID. If the set of parameters includes the destination ID, the UE may use the set of parameters for transmission to the specific UE or UE group defined by the destination ID. If a UE is configured with set of parameters without the destination ID, the UE may use the set of parameters for transmission to any UE or UE group.

Sensing for SL Transmission

In some of the embodiments described herein, for the purpose of a UE to UE sidelink transmission, the transmitting UE selects a transmission pattern to use for the transmission.

The transmitting UE1 is aware, via higher layer SL CG configuration achieved using one of the various methods described below, of the pool of possible patterns before making the selection. The pool of transmission patterns is one specific example of SL transmission resources.

In some embodiments, the resources that the UE can select between are configured based on a SL communication resource configuration. The SL communication resource configuration can be a pattern (one-dimensional, two-dimensional, also known as time-frequency repetition pattern, etc.), a pool of patterns, and a repetition number. For example, the SL communication resource configuration could be pre-configured. The configured/pre-configured SL communication resource configuration may be provided by a device manufacturer or a network operator (e.g., via a subscriber identity module). The SL communication resource configuration may be also provided by the network operator when a UE is in coverage of a base station so that the SL communication resource configuration is available wherever the UE may be, such as when the UE moves out of the network coverage.

In some embodiments, selection of transmission resources from a pool is based on long-term sidelink measurement. In some embodiments, this approach is performed only when the UE is out of network coverage. Alternatively, the approach can be employed at any time irrespective of whether the UE is in or out of network coverage.

More specifically, a transmitting UE will monitor sidelink transmission resources on an ongoing basis. This can involve monitoring a pool of possible transmission resources or a pool of transmission patterns, for example. For example, the UE may measure reference signal receive power (RSRP) or reference signal receive quality (RSRQ) or some other characteristic of signals that might be present on the resources. The measurements may be averaged over a defined period of time to generate a metric for each transmission resource. A higher metric for a given resource is an indication that the given resource is more heavily loaded on average. Then, the UE takes this information into account in making a selection for transmission.

In a specific example, the UE ranks the possible resources according to the calculated metric, and selects the resource with the most favourable metric (which can be the lowest or the highest depending on the nature of the metric). If the metric reflects some measure of average power, the UE would select the lowest metric, as this would reflect the least loaded resource. In another embodiment, the UE can select, for example randomly, from any resource that has a metric below/above a predefined threshold. In another embodiment, the UE can select, for example randomly, from the top X percent of resources that has a metric below/above a predefined threshold where X can be a number less than 100, typically 10 or 20.

A specific example will be described with reference to FIG. 1K. Here, on an ongoing basis, the UE monitors each of the four frequencies F1, F2, F3 and F4, over the five time periods (which are assumed to repeat cyclically in this example). A metric for each pattern is determined based on this monitoring. For example, for the UE1 pattern, the transmitting UE measures on F1 during T0, and F3 during T1, and produces a metric for the UE1 pattern by combining these measurements. Such measurements are done for each of the patterns. The patterns are then ordered by metric and a pattern is selected based on the ordering. The decision may be based on the metric determined for measurements over a specified window of time, for example over a configured number of time slots, or more generally a configured period of time (which can be configured in terms of a number of time slots or some other basis).

Optionally, the UE may also perform this long-term sensing procedure in order to independently and dynamically select between different grant-free SL configurations.

In some embodiments of the invention, a transmitting UE makes a selection of a transmission resource, for the purpose of a sidelink transmission, based on additional information obtained from short-term sidelink measurement. In some embodiments, this approach is performed only when the UE is out of network coverage. Alternatively, the approach can be employed at any time irrespective of whether the UE is in or out of network coverage.

More specifically, whether the network is involved in scheduling a sidelink transmission or not, a transmitting UE will monitor SL transmission resources on a short-term basis, just before making a selection of a resource for a sidelink transmission. This can involve making a short-term measurement of a pool of possible transmission resources or pool of transmission patterns, for example. For example, the UE may measure energy levels across a specified frequency band(s). The UE may then perform a clear channel assessment (CCA) by comparing the measured energy levels to a specified threshold. The short term measurement allows the UE to assess whether a given resource is being used during a current transmission period. Then, the UE takes this information into account in making a selection for a current transmission.

The measurements can, for example, be similar to those taken with listen before talk (LBT) protocols, which typically include a CCA procedure. In some embodiments, the UE makes the short-term measurements for multiple resources, possibly all, and makes a selection based on the measurements. This can involve determining which of the resources are not being used for a current transmission period, and selecting between those resources. In another embodiment, the UE makes an initial selection of a resource for transmission (possibly based on sidelink control information and/or long-term sidelink measurements) and then makes the short term measurement for the selected resource. If the resource is occupied as indicated by the short-term measurement, the UE makes another selection, or waits a backoff time, for example a random backoff time, before measuring the same resource again. Once the UE identifies a resource not being used, the UE goes ahead with the transmission using that resource.

A specific example will be described with reference to FIG. 1K. Assume the UE has made an initial selection of pattern UE1. The UE makes a short term measurement of the resources for UE1. If such measurement indicates the pattern is not being used, the UE can go ahead with the sidelink transmission using that pattern. If the short term measurement indicates that pattern is being used, the UE selects a different pattern or waits a random backoff time before performing another short term measurement of the resources for UE1.

In some embodiments, the selection of a transmission resource for sidelink transmission is based on a combination of sidelink control information and long-term sidelink measurement.

In some embodiments, the selection of a transmission resource for sidelink transmission is based on a combination of sidelink control information and short-term sidelink measurement.

In some embodiments, the selection of a transmission resource for sidelink transmission is based on a combination of short-term sidelink measurement and long-term sidelink measurement.

In some embodiments, the selection of a transmission resource for sidelink transmission is based on a combination of sidelink control information, long-term sidelink measurement, and short-term sidelink measurement.

Monitoring of transmission resources as described above can also be referred to as sensing, and this can include short-term measurements and/or long-term measurements.

Optionally, the UE may also perform this short-term sensing procedure in order to independently and dynamically select between different grant-free SL configurations.

Figure 3:
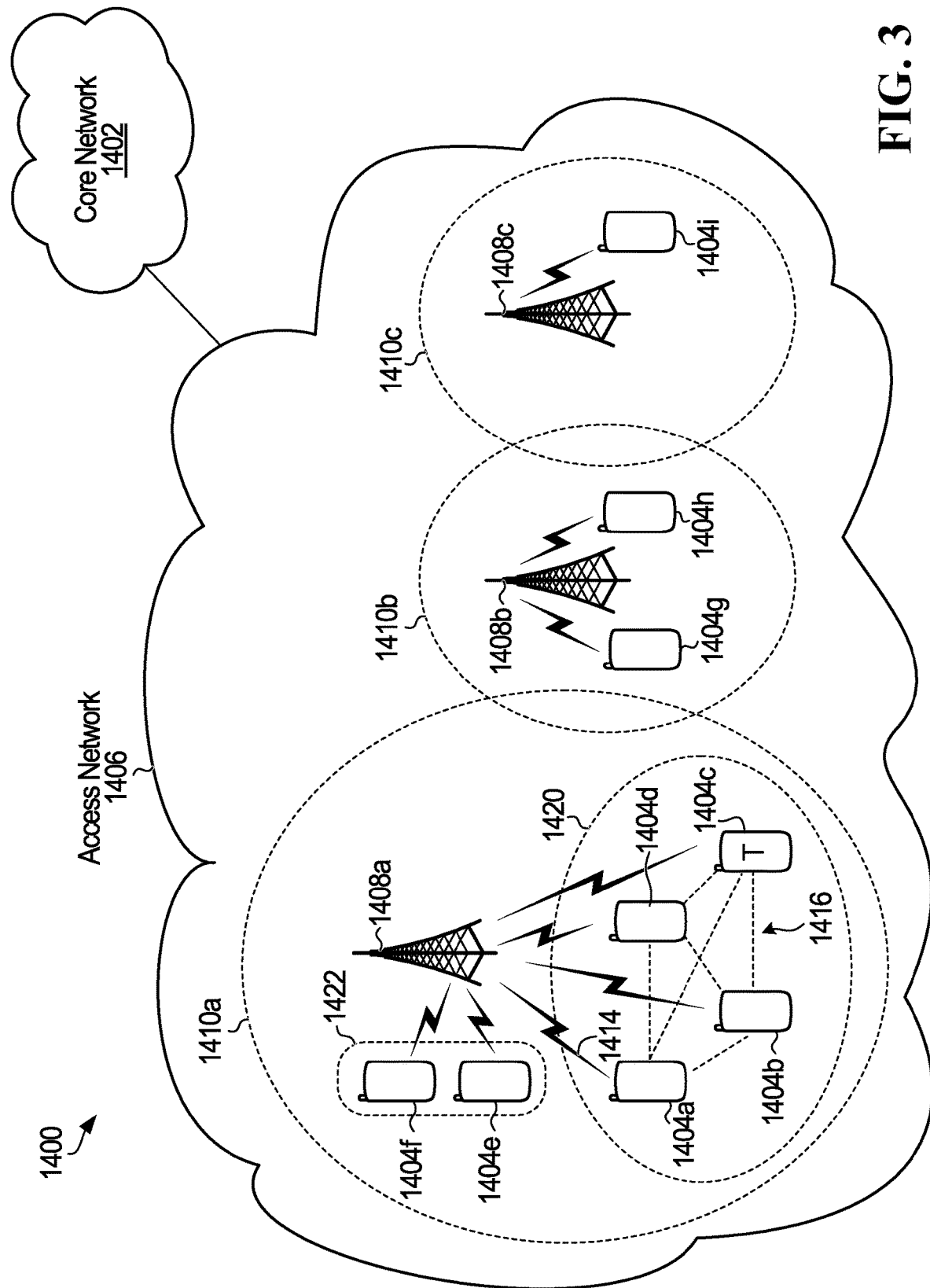
FIG. 3 is a block diagram illustrating an example of a telecommunications network according to one embodiment.

FIG. 3 is a block diagram illustrating an example of a telecommunications network 1400 according to one embodiment, for implementing any one or combination of two or more of the above described methods. The telecommunications network 1400 includes a core network 1402 and an access network 1406. The access network 1406 serves a plurality of UEs 1404a, 1404b, 1404c, 1404d, 1404e, 1404f, 1404g, 1404h, and 1404i. The access network 1406 could be an Evolved Universal Terrestrial Access (E-UTRA) network. As another example, the access network 1406 could be a cloud access network (C-RAN). The access network 1406 includes a plurality of BSs 1408a, 1408b, and 1408c. The BSs 1408a-c each provides a respective wireless coverage area 1410a, 1410b, and 1410c. Each of the BSs 1408a-c could be implemented using a radio transceiver, one or more antennas, and associated processing circuitry, such as antenna radio frequency (RF) circuitry, analog-to-digital/digital-to-analog converters, etc.

Although not illustrated, the BSs 1408a-c are each connected to the core network 1402, either directly or through one or more central processing hubs, such as servers. The BSs 1408a-c could serve as a gateway between the wireline and wireless portion of the access network 1406.

Each one of BSs 1408a-c may instead be referred to as a base transceiver station, a radio BS, a network node, a transmit node, a transmit point, a Node B, an eNode B, or a remote radio head (RRH), depending upon the implementation.

In operation, the plurality of UEs 1404a-i access the telecommunications network 1400 using the access network 1406 by wirelessly communicating with one or more of the BSs 1408a-c.

UEs 1404a-d are in close proximity to each other. Although the UEs 1404a-d can each wirelessly communicate with the BS 1408a, they can also directly communicate with each other, as represented at 1416. The communications represented at 1416 are direct communications between UEs that do not go through an access network component, such as a BS. As shown in FIG. 3, UE to UE communications 1416 are directly between the UEs 1404a-d and are not routed through the BS 1408a, or any other part of the access network 1406. Communications 1416 may also be referred to as lateral communications. In embodiments disclosed herein, UE to UE communications use an SL channel and an SL air interface. On the other hand, a communication between an access network component, such as BS 1408a, and a UE, as in communication 1414, is called an access communication. An access communication occurs over an access channel, which can be a UL or DL channel, and an access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), and Wi-Fi.

By using the SL communications 1416, the UEs 1404a-d may be able to assist with wireless communications between the UEs 1404a-d and the BS 1408a. As one example, if UE 1404c fails to correctly decode a packet received from the BS 1408a, but if UE 1404d is able to receive and correctly decode the packet from the BS 1408a, then UE 1404d could directly transmit the decoded packet to UE 1404c using SL communications 1416. As another example, if UE 1404c moves out of wireless coverage area 1410c, such that UE 1404c can no longer wirelessly communicate with the BS 1408a, then UE 1404b could forward messages between the UE 1404c and the BS 1408a. As another example, UE 1404a and UE 1404c could both receive a signal transmitted from the BS 1408a that carries a packet meant for UE 1404c. UE 1404a may then transmit to UE 1404c, via SL communications 1416, the signal as received by UE 1404a. UE 1404c may then use the information received from UE 1404a to help decode the packet from the BS 1408a. In these examples, capacity and/or coverage may be enhanced through the assistance of UEs 1404a, 1404b, and/or 1404d. V2X communications as referenced herein are an example of SL communications.

The UEs 1404a-d form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group, i.e. address all other UEs within the UE group 1420. The UE group 1420 may form a logical or virtual device mesh in which the members of the UE group 1420 communicate amongst themselves using UE communications over an SL air interface, but the UE group 1420 as a whole acts as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408a, then that particular UE is referred to as the target UE. In the examples above, UE 1404c is being assisted and so is the TUE 1404c. The other UEs 1404a, 1404b, and 1404d in the group 1420 form a cooperation candidate set, which is a set of UEs that may cooperate to help the TUE 1404c. The subset of UEs in the cooperation candidate set that actually assist the target UE 1404c form a cooperation active set. The cooperation active set may be dynamically selected to assist the target UE 1404c. The UEs in the cooperation active set are referred to as cooperating UEs (CUEs). In UE group 1420, UEs 1404a, 1404b, and 1404d form the cooperation candidate set. If UEs 1404a and 1404b actually assist target UE 1404c, then UEs 1404a and 1404b form the cooperation active set and are the CUEs. As UEs 1404a-d move around, some may leave the UE group 1420 and/or other UEs may join the UE group 1420. Therefore, the cooperation candidate set may change over time, e.g., the cooperation candidate set may change semi-statically. The UE group 1420 may also be terminated by the network 1406, e.g., if the network determines that there is no longer a need or opportunity for the UE group 1420 to provide assistance in wireless communication between the BS 908a and members of the UE group 1420.

There may be more than one UE group. For example, UEs 1404e and 1404f in FIG. 3 form another UE group 1422.

Figure 4:
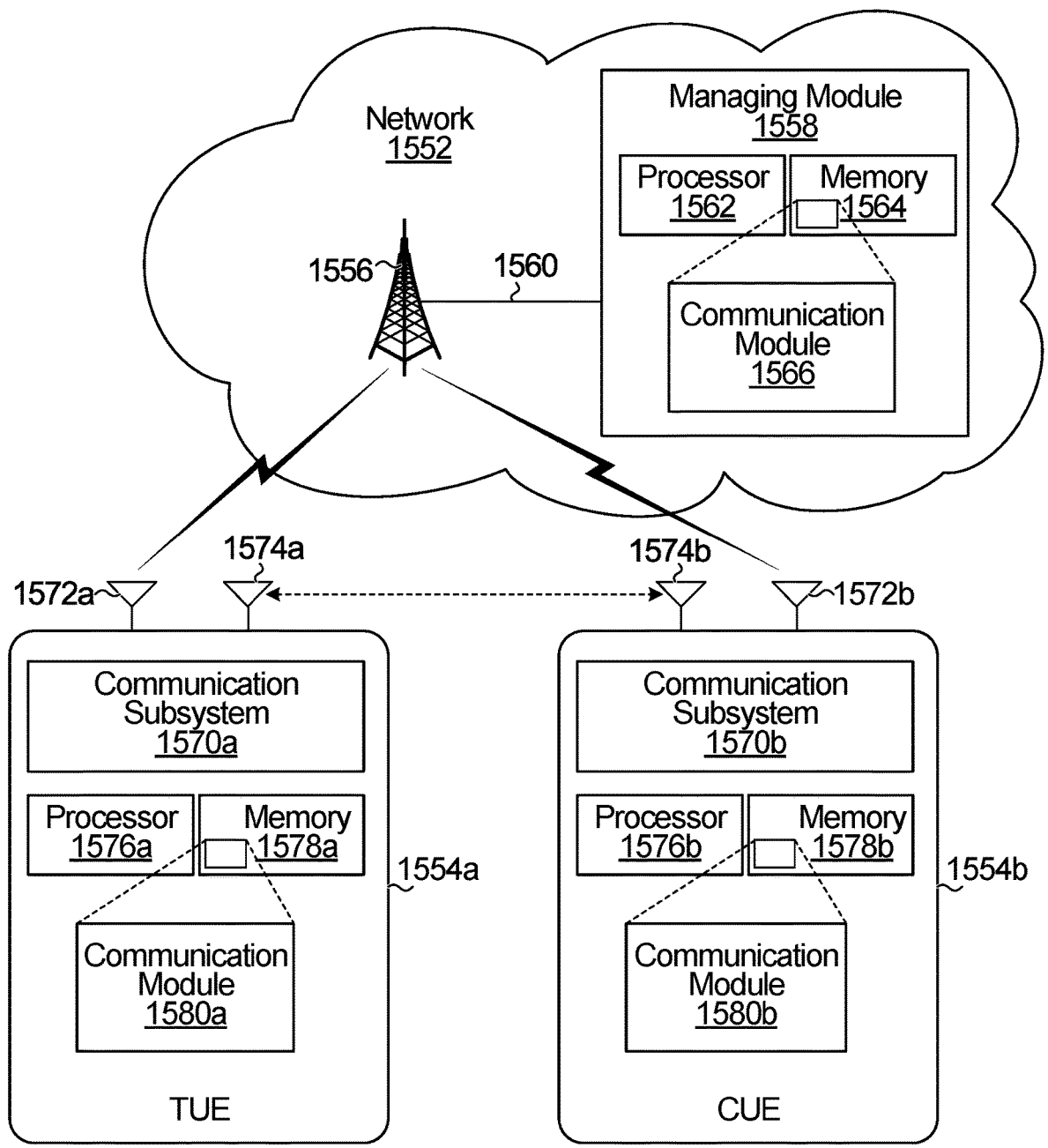
FIG. 4 is a block diagram illustrating an example of a network serving two UEs.

FIG. 4 is a block diagram illustrating an example of a network 1552 serving two UEs 1554a and 1554b, according to one embodiment. The network 1552 may be the access network 1406 from FIG. 3, and the two UEs 1554a and 1554b may include the functionality of any of the embodiments described herein. However, more generally this need not be the case, which is why different reference numerals are used in FIG. 4.

The network 1552 includes a BS 1556 and a managing module 1558. The managing module 1558 instructs the BS 856 to perform actions. The managing module 858 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module 1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554a includes a communication subsystem 1570a, two antennas 1572a and 1574a, a processor 1576a, and a memory 1578a. The UE 1554a also includes a communication module 1580a. The communication module 1580a is implemented by the processor 1576a when the processor 1576a accesses and executes a series of instructions stored in the memory 1578a, the instructions defining the actions of the communication module 1580a. When the instructions are executed, the communication module 1580a causes the UE 1554a to perform the actions described herein in relation to establishing and participating in a UE group. Alternatively, the module 1580a may be implemented by dedicated circuitry, such as an ASIC or an FPGA.

The communication subsystem 1570a includes processing and transmit/receive circuitry for sending messages from and receiving messages at the UE 1554a. Although one communication subsystem 1570a is illustrated, the communication subsystem 1570a may be multiple communication subsystems. Antenna 1572a transmits wireless communication signals to, and receives wireless communications signals from, the BS 1556. Antenna 1574a transmits SL communication signals to, and receives SL communication signals from, other UEs, including UE 1554b. In some implementations there may not be two separate antennas 1572*a* and 1574*a*. A single antenna may be used. Alternatively, there may be several antennas, but not separated into antennas dedicated only to SL communication and antennas dedicated only to communicating with the BS 1556.

SL communications could be over Wi-Fi, in which case the antenna 1574*a* may be a Wi-Fi antenna. Alternatively, the SL communications could be over Bluetooth™, in which case the antenna 1574*a* may be a Bluetooth™ antenna. SL communications could also or instead be over licensed or unlicensed spectrum.

The UE 1554*b* includes the same components described above with respect to the UE 1554*a*. That is, UE 1554*b* includes communication subsystem 1570*b*, antennas 1572*b* and 1574*b*, processor 1576*b*, memory 1578*b*, and communication module 1580*b*.

The UE 1554*a* is designated as a target UE (TUE) and will therefore be called TUE 1554*a*. The UE 1554*b* is a cooperating UE and will therefore be called CUE 254*b*. The CUE 1554*b* may be able to assist with wireless communications between the BS 1556 and TUE 1554*a* if a UE group were to be established that included TUE 1554*a* and CUE 1554*b*. Other communication scenarios are also contemplated, in a V2X application, for example.

UE 1554*a* may be specifically chosen as the target UE by the network 1552. Alternatively, the UE 1554*a* may itself determine that it wants to be a target UE and inform the network 1552 by sending a message to the BS 1556. Example reasons why UE 1554*a* may choose or be selected by the network 1552 to be a target UE include: low wireless channel quality between the UE 1554*a* and the BS 1556, many packets to be communicated between the BS 1556 and the UE 1554*a*, and/or the presence of a cooperating UE that is a good candidate for helping with communications between the BS 1556 and the UE 1554*a*.

UE 1554*a* need not always stay a target UE. For example, UE 1554*a* may lose its status as a target UE once there is no longer a need or desire for assistance with wireless communications between UE 1554*a* and the BS 1556. UE 1554*a* may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 1554*a* acts only as a target UE, i.e., TUE 1554*a*, and the UE 1554*b* is a cooperating UE to the TUE 1554*a*, i.e., CUE 1554*b*.

A UE may perform retransmission based on different configurations. For dynamic scheduling in Mode 1, the resource used for retransmission may be configured in the DCI that is used to schedule a SL transmission. For configured grant, the retransmission may be configured in RRC for Type 1 or RRC plus DCI in configured grant Type 2. For Mode 2 UE, the UE may select the retransmission resource or resource pattern for retransmission.

Figure 6:
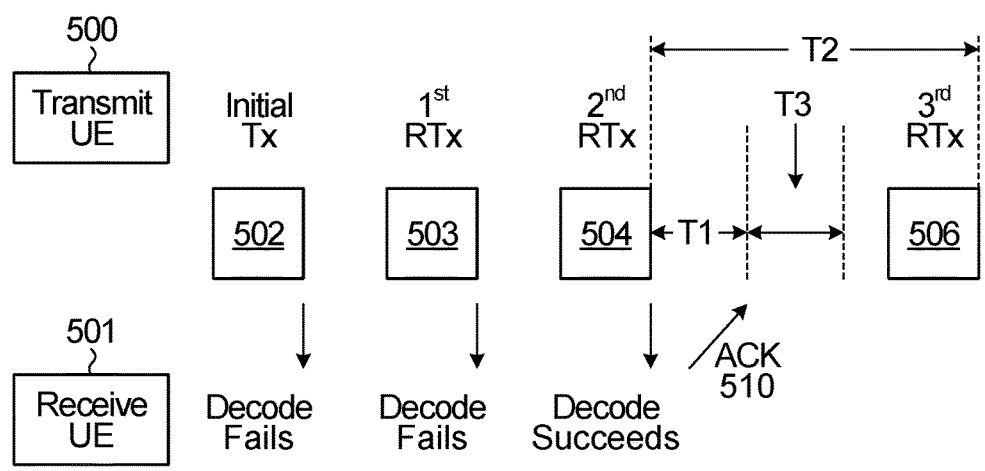
FIG. 6 is a timing diagram for the purpose of illustrating when early termination will be beneficial.
Figure 7:
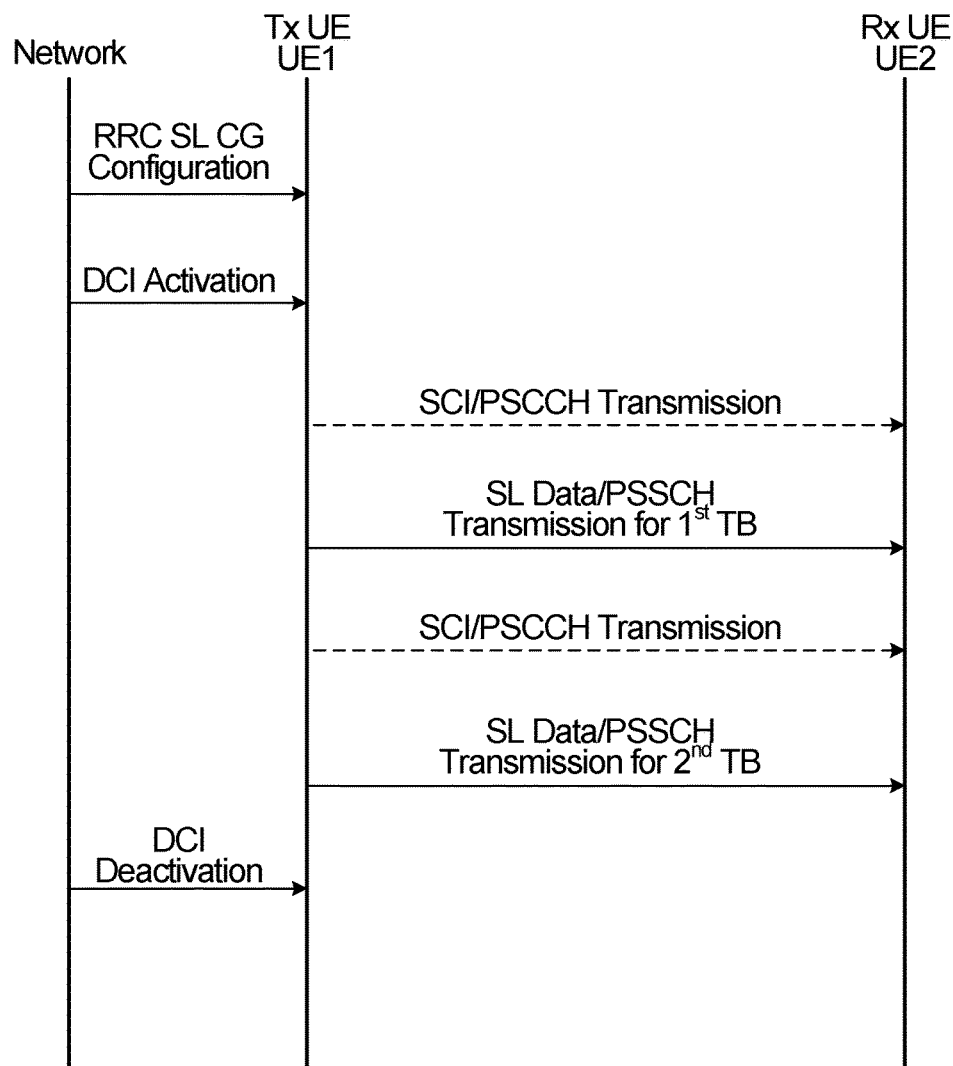
FIG. 7 is a signal flow diagram for an example of a Type 1 CG exchange.
Figure 8:
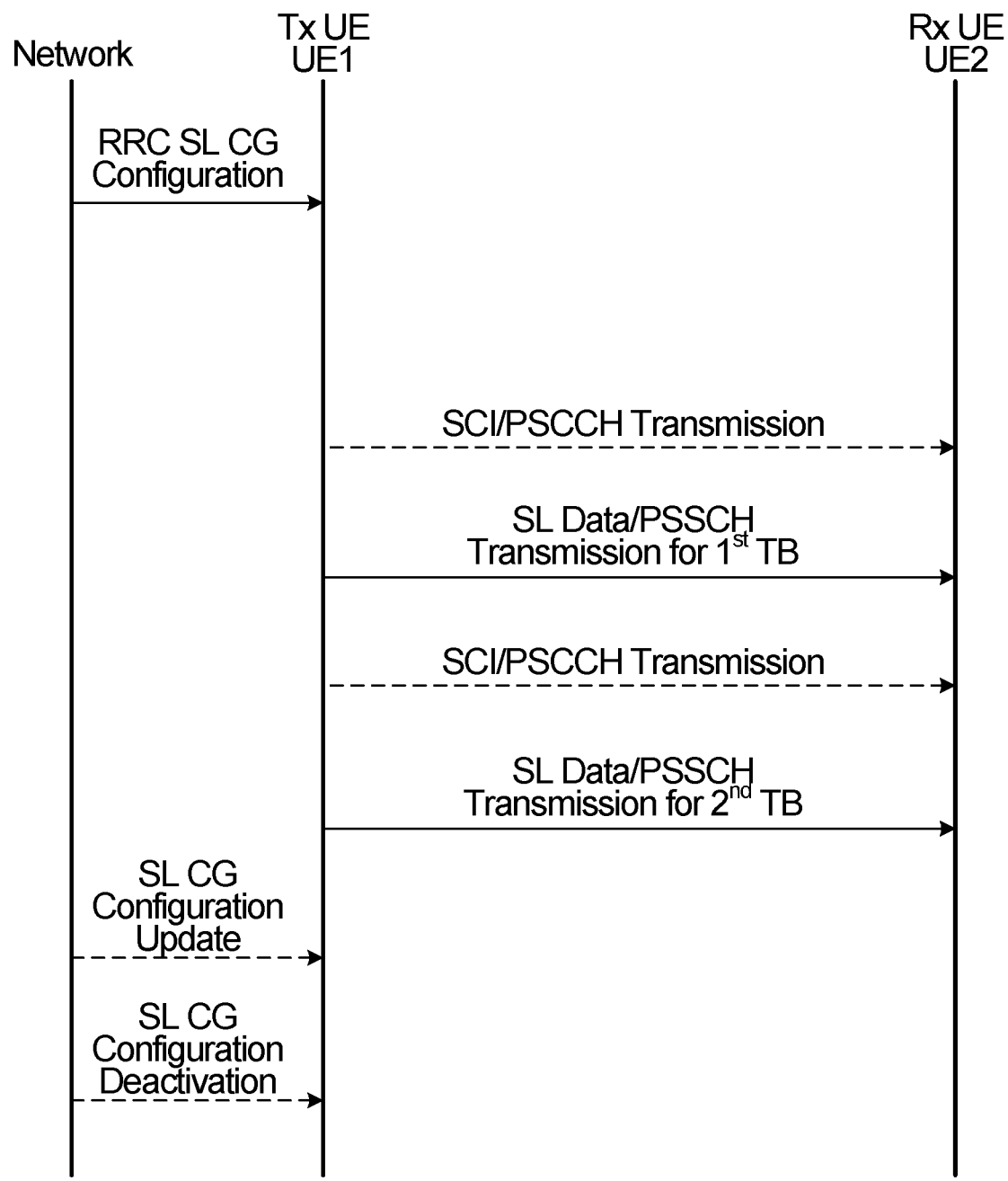
FIG. 8 is a signal flow diagram for an example a Type 2 CG exchange.

An example of a Type 1 CG exchange is shown in FIG. 6. An example of a Type 2 CG exchange is shown in FIG. 7.

In the embodiments described below, reference is made to SL CG transmissions, but it is to be understood that these embodiments are not limited to use of SL CG transmission, but are more generally applicable to any sidelink transmission of a TB that includes an initial transmission and retransmissions that occur without waiting for HARQ feedback An embodiment of the disclosure provides a method of SL transmission. The method involves a first UE receiving at least one sidelink (SL) transmission of a set of SL transmissions from a second UE, the set of SL transmissions comprising an initial SL transmission and a plurality of SL retransmissions. In response to each received SL transmission, the first UE determines whether to transmit an acknowledgement (ACK) when the received SL transmission is decoded successfully based on one or a combination of two or more of:

a number of transmissions of the plurality of SL retransmissions received by the first UE;

a time gap between the received SL transmission and a last SL transmission of the plurality of transmissions;

a processing time for to the second UE to process the ACK feedback.

Further details of each of the options listed in the above described embodiment are provided in the description of the examples and embodiments below.

Embodiment: Configuration of the Timing Between Transmission and HARQ Feedback

In this embodiment, to enable the HARQ feedback and retransmission according to the HARQ feedback, such that the transmitter UE and the receive UE both know the resource used for transmitting the HARQ feedback, the transmit UE (the UE making the SL transmission) and the receive UE (the UE receiving the SL transmission) are both configured with information regarding the time gap of the physical shared feedback channel (PSFCH) and the associated PSSCH transmission. In addition, this timing information may be used for early termination of HARQ retransmission as detailed below.

For the detailed configuration of the timing, both the transmit UE and the receive UE need to be aware of the timing in advance. In some embodiments, the time gap between the PSFCH and the associated PSSCH transmission may be configured, or preconfigured.

In some embodiments, to associate the time gap with a resource pool (RP) configuration, for each RP, a time gap is configured as part of the RP configuration. The RP can be UE specific or cell common. The RP can be configured in radio resource control (RRC), system information block (SIB) or preconfigured, although the RP configuration is meant to be common for all UEs use the same RP. The preconfiguration of the RP may be a configuration received previously from BS in a RRC signaling or system information (e.g. in SIB). The preconfiguration may be also preconfigured in a device, by the network in advance, or hard coded into the UE. It is noted that the various options for preconfiguration that are described throughout this disclosure in the context of specific embodiments can more generally be applied for any embodiment that makes use of preconfiguration.

In some embodiments, a gNB (more generally some network component) configures the transmit UE with the time gap information, and the transmit UE sends the timing information to the receive UE via upper layer sidelink signaling, for example via PC5 RRC or group PC5 RRC. In this case, the time gap can be configured on a UE-specific basis. Alternatively, gNB may send the time gap information to both transmit UE and receive UE/UEs, e.g., via RRC signaling. In some embodiment, there may be an indication of whether the time gap is for the transmission or reception. This can be achieved, e.g., via explicit indication or by including the time gap within a transmit or receive configuration.

In some embodiments, for a configured grant transmission, the configuration of the time gap can be part of the configured grant configuration.

In some embodiments, the configuration of the time gap occurs outside the configuration of the resource pool. The time gap can be preconfigured or predefined.

In some embodiment, the PSFCH resource is configured or preconfigured in advance. For example, PSFCH resource can be configured as periodic resource that occurs every M slots, where M is the PSFCH periodicity. The time gap (pre)configured may indicate the minimum time gap between the SL data transmission (PSSCH) and the feedback transmission (PSFCH). The HARQ feedback may be transmitted at earliest (pre)configured PSFCH resource that has a time gap that is larger than the minimum time gap that is (pre)configured or predefined.

Embodiment: Early Termination of Blind Retransmission

As noted above, for a given TB, a UE may be configured to make an initial transmission followed by a set number of retransmissions of a TB. If the retransmission(s) is not initiated based on feedback of previous transmissions or based on a new scheduling grant from the, the retransmission may be known as a blind retransmission or a repetition. The configuration of the initial transmission and the retransmission(s) can occur for example via dynamic scheduling, configured grant Type 1 and Type 2 or any Mode 2 SL transmission. For the sake of brevity, a "blind retransmission" shall hereinafter be used interchangeably with, and referred to simply as, a "retransmission" unless noted otherwise.

A UE may perform initial transmission and set of retransmissions based on different configurations, grants or UE selections. The configuration may include, e.g., a number of retransmissions and/or transmission pattern. For dynamic scheduling in Mode 1, the resource used for initial transmissions and retransmissions may be configured in the DCI that is used to schedule a SL transmission. For configured grant, the initial transmission and retransmissions may be configured in RRC for Type 1 or RRC plus DCI in configured grant Type 2. For Mode 2 UE, the UE may select the initial and retransmission resource or resource pattern for retransmissions.

In the absence of any feedback from the receive UE, the transmit UE will make all of the set number of retransmissions. However, if the UE successfully receives a SL CG transmission (either the initial transmission or one of the retransmissions) of the TB before all of the retransmissions have been made, it would be efficient from a resource utilization standpoint to let the transmit UE know so that a retransmission can be terminated. Successful reception of a SL CG transmission means that the UE is able to decode the data successfully. For SL CG transmissions, the retransmissions may be spread out in time depending on the configuration. In contrast, for normal uplink transmission from a UE to a base station, typically retransmissions are consecutive/adjacent. Because of this, the benefit of early termination for SL CG transmissions is more than would be the case for normal uplink transmission where an ACK/NACK channel is already defined.

In a first embodiment, if the receive UE identifies that the successful SL transmission is any initial transmission or retransmission other than the last retransmission (i.e., if there is at least one further retransmission expected) the receive UE transmits an ACK at a predefined timing.

The receive UE may identify the SL retransmissions through different ways. In some embodiments, a physical sidelink control channel (PSCCH) transmission associated with the PSSCH transmission contains information about all the transmission/retransmissions of the TB. Based on this information, the UE can determine whether a received SL transmission for a TB is the initial transmission or the Nth retransmission. In some embodiments, the UE can determine whether there are additional retransmissions by decoding SCI or (blind) detection of DMRS or based on CG configuration that is sent to the receiver. For example, different DMRS sequences can be associated with different transmissions of a TB such that decoding the DMRS can allow the UE to determine which transmission has been received of the set of transmission for a TB. In another example, different DMRS may be associated with different transmission patterns, and successfully detecting the DMRS may be used to determine which transmission pattern or which time frequency resources are used for the retransmissions of the TB. In another example, SCI may include transmission resources for retransmission and decoding SCI means receive UE can determine the number of retransmissions and the retransmission resource used by the transmit UE. In another example, in SL CG transmission, the number of transmissions/retransmissions for a TB and retransmission resources are configured to both transmit UE and receive UE, therefore, the receive UE can identify the number of transmissions and retransmission resources for a TB.

In some embodiments, the UE does not send a negative acknowledgement (NACK) if it does not decode a SL transmission successfully. There is no value in this if additional retransmission(s) will occur in the absence of any HARQ feedback. Thus, after failing to decode data for a SL transmission, if the UE determines at least one more retransmission is coming for the same, then the UE does not transmit a NACK. If the UE determines a SL transmission is the last retransmission, the UE sends an ACK or a NACK depending on whether the data was successfully decoded.

In one embodiment, the UE sends an ACK only if the successfully decoded SL transmission is the initial transmission, or up to the M-1$^{st}$ retransmission, where M may be configured by a base station (e.g in RRC signaling or system information (e.g. in SIB) or DCI signaling), or indicated in SCI, or preconfigured/predefined. For example, in the case of SL CG transmission, M may be configured within the SL CG configuration. To have the most benefit, M may be chosen such that there is still some value in transmitting the ACK, in that the transmit UE will receive it in time to terminate transmission before at least the last retransmission has been made.

Figure 5A:
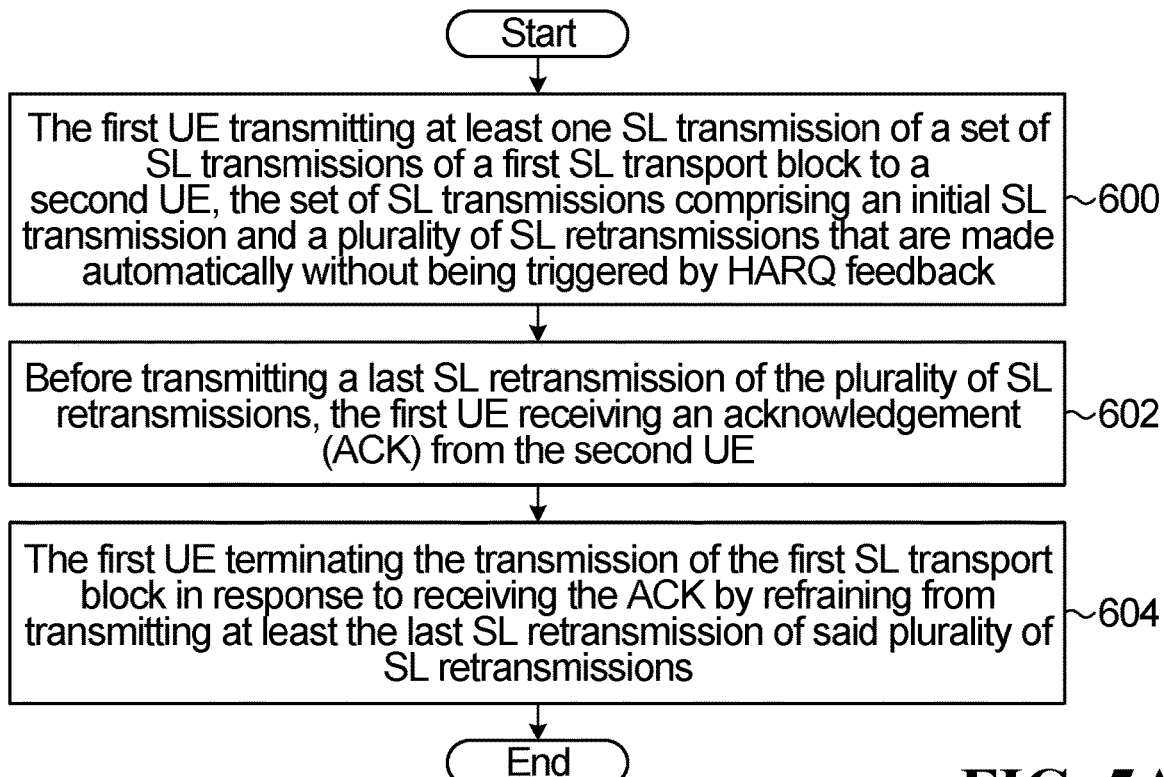
FIG. 5A is a flowchart of a method of SL CG transmission provided by an embodiment of the disclosure.

Referring now to FIG. 5A, shown is a flowchart of a method of SL transmission by a transmit UE provided by an embodiment of the disclosure. The method begins at block 600 with a first UE transmitting at least one transmission of a set of transmissions of a first sidelink (SL) transport block to a second UE, the set of transmissions of the SL transport block comprising an initial SL transmission and a plurality of SL retransmissions that are made automatically without being triggered by HARQ feedback or a retransmission scheduling grant. The method continues at block 602 with, before transmitting a last SL retransmission of the plurality of SL retransmissions, the first UE receiving an acknowledgement (ACK) from the second UE. The method continues at block 604 with the first UE terminating the transmission of the first SL transport block in response to receiving the ACK by refraining from transmitting at least the last SL retransmission of said plurality of SL retransmissions.

Figure 5B:
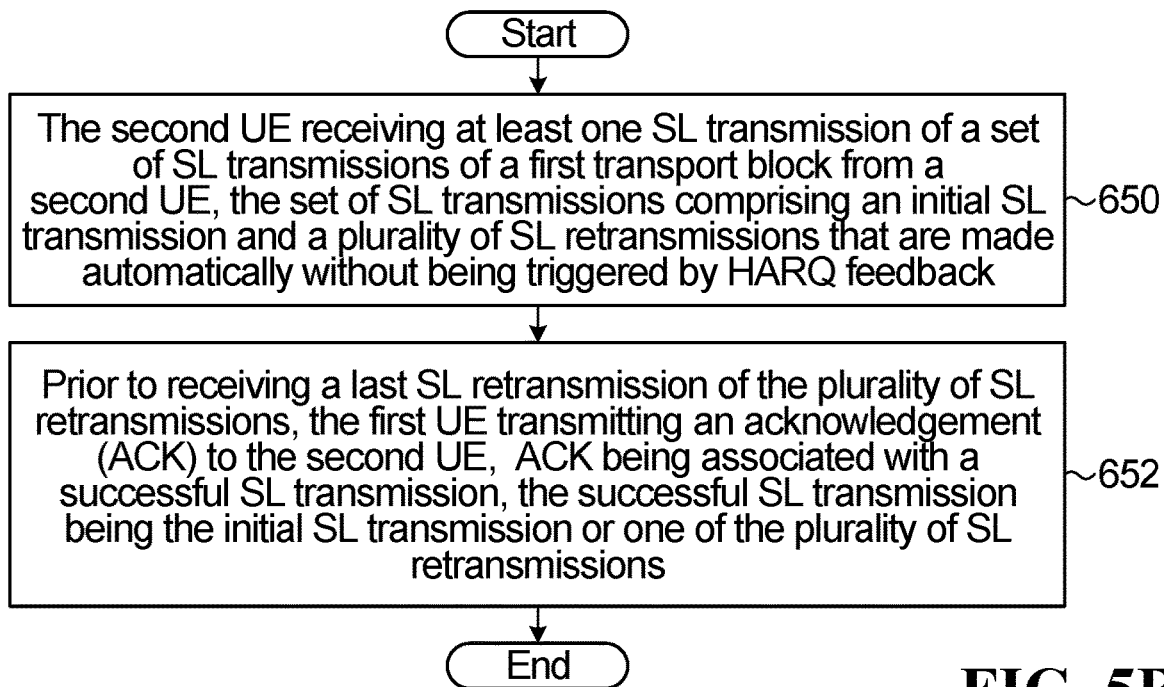
FIG. 5B is a flowchart of a method of SL CG reception provided by an embodiment of the disclosure.

Referring now to FIG. 5B, shown is a flowchart of a method of SL reception by a receive UE provided by an embodiment of the disclosure. The method begins at block 650 with a first UE receiving at least one transmission of a set of transmissions for a first sidelink (SL) transport block from a second UE, the set of transmissions comprising an initial SL transmission and a plurality of SL retransmissions that are made automatically without being triggered by HARQ feedback or a retransmission scheduling grant. The method continues at block 652 with, prior to receiving a last SL retransmission of the plurality of SL retransmissions, the first UE transmitting an acknowledgement (ACK) to the second UE, ACK being associated with a successful SL transmission, the successful SL transmission being the initial SL transmission or one of the plurality of SL retransmissions.

The ACK is associated with the transmission of TB. The association may be through associate of the ACK with a successful SL transmission. The physical resources of the ACK are related to time and frequency resources of the successful SL transmission. This may be through one of: table lookup; mathematical relationship; through a configured or predefined time gap between the ACK and the successful SL transmission.

For example, the time resource of ACK resource may be calculated based on the timing of receiving the successful SL transmission and the (pre)configured time gap between the PSSCH transmission and PSFCH transmission. The frequency resource may be calculated based on the frequency sub-channels used by the PSSCH transmission.

For groupcast, the benefit of early termination is much less, because retransmissions will have to continue until all UEs in the group successfully receive a SL transmission, and it is much less likely, statistically, to be able to terminate early. In some embodiments, one of the above-described methods are employed for unicast transmission, but for a groupcast transmission, there is no ACK/NACK sent before the last retransmission, and an ACK/NACK is sent for the last retransmission.

In another embodiment, for groupcast transmission, early termination is based on receiving an ACK from all of the UEs in the group. Upon receiving an ACK from the last UE in the group, SL transmission can be terminated.

Use of Preconfigured/Configured Time Gaps

Methods have been described above for configuring/preconfiguring UEs with time gaps for retransmission and HARQ feedback. In some embodiments, for the purpose of early termination of retransmissions, as detailed above, the UE makes use of one or more preconfigured/configured time gaps to decide whether a transmitted ACK/NACK can be decoded by the transmit UE on time to terminate retransmission before the last retransmission, or more generally, before an Mth transmission.

Referring to FIG. 6, shown is a timing diagram for a TB transmission between a transmit UE 500 and a receive UE 501. The TB transmission includes an initial transmission 502 and three retransmissions 503, 504, 506, where retransmission 506 is the last retransmission. For this example, it is assumed that decoding fails for the initial transmission 502, and for the second retransmissions 503, but that decoding is successful for the third retransmission 504. An ACK is shown transmitted at 510 in respect of successful decoding of the second retransmission 503. The time gap between the second retransmission 504 and the last retransmission 506 is T2. The feedback time gap T1 is the time from the transmit UE's perspective between transmitting the second retransmission 504 and receiving an ACK in respect of that transmission. T3 is the processing time at the transmit UE to process a received ACK/NACK. T1 can be configured or preconfigured as discussed in other parts of this disclosure.

In some embodiments, a decision of whether to transmit the ACK depends on one or more of T1,T2,T3. In a specific example, in order that transmitting the ACK at 510 will be such that the ACK can be received in time by the transmit UE 500 to allow early termination, by not transmitting at least the last retransmission 506, the following inequality must be satisfied:

$$T1+T3<T2.$$

In some embodiment, the processing time T3 may be replaced by a constant threshold that is (pre)configured or predefined.

The gap T2 in FIG. 6 is between the second to last transmission 504 and the last transmission 506. This is the smallest T2 will be for any of the retransmissions. The gap T2 between the first retransmission 503 and the last transmission 506 will be much larger, allowing more flexibility in the inequality being satisfied.

In some embodiment, T2 refers to the time gap between the current transmission/retransmission ($2^{nd}$ RTx 504 in FIG. 6) that is decoded successfully and the last retransmission ($3^{rd}$ RTx). In some embodiment, the time gap between the current transmission/retransmission that is decoded successful and the next retransmission is used for T2, which is used to determine whether to transmit the ACK. This may be used, e.g., in the case where only the time gap between two adjacent transmissions/retransmissions are available to the UE while the time gap between the current transmission and the last transmission may be not available.

In some embodiment, after the transmit UE terminate the retransmission, UE may use the retransmission resource that is freed from the early termination to transmit new data (or a new TB).

Early Termination by Network

In some embodiments, the network (e.g. gNB) can early terminate or preempt the SL retransmission by sending a DCI for termination of the current TB. This can be due to different reasons. For example, if the network has scheduled another dynamic transmission at the same resources or find potential collision of the resource in the SL retransmission, network can terminate or preempt the SL retransmission that is previously set to be performed by the UE. In another example, network may receive an ACK by the receive UE and network then send a termination or preemption signal to terminate the further SL retransmissions. In some embodiment, the DCI for termination/preemption of retransmissions may also implicitly or explicitly carry an ACK signal. In some other embodiment, the DCI for termination/preemption of retransmission may be a termination/preemption signal for SL retransmission without carrying an ACK. In the case of dynamic signaling, the DCI should be addressed to the cell radio network temporary identifier (C-RNTI) that is the same RNTI used for scheduling grant. In some embodiment, the dynamic grant of SL is different than the C-RNTI used for UL or DL scheduling, in which case, a SL C-RNTI may be used for SL dynamic scheduling and SL C-RNTI is used to address the DCI for early termination for dynamic scheduling case. For a DCI to be addressed to a RNTI, it typically indicates that at least the CRC of the DCI is scrambled by the RNTI. In some embodiment, the RNTI is used futher to scrambling the data of DCI or PDCCH. This can be applicable to other part of the disclosure where a RNTI is used to address a DCI.

In the case of SL CG transmission, the DCI for termination may be addressed to SL configure scheduling-radio network temporary identifier (SL CG-RNTI). More generally, whenever SL CG-RNTI is referred to herein, embodiments can alternatively be implemented with any addressing scheme used for downlink control information.

SL CG-RNTI

For SL configured grant transmission, a SL CG-RNTI may be defined for SL CG transmissions. SL CG-RNTI may be part of configured grant configuration. SL CG-RNTI may be used to address to DCI that is related to SL CG transmissions. The SL CG-RNTI may be different than configured grant (CG) RNTI that is used for UL and DL configured grant transmission. SL CG-RNTI may be used to both Type 1 and Type 2 SL configured grant transmission. In case of both Type 1 and Type 2 configured grant is configured for the UE, they may share the same SL CG-RNTI.

For Type 1 CG transmission, SL CG-RNTI may be used for termination/preemption of SL retransmission of a SL CG transmission as described earlier and SL retransmission grant of an initial transmission of a SL CG transmission. SL CG-RNTI may be used to address to the DCI sent by the network/BS/gNB used for the above purposes.

For Type 2 CG transmission, SL CG-RNTI may be used for termination/preemption of SL retransmission of a SL CG transmission as described earlier in addition to SL retransmission grant of an initial transmission of a SL CG transmission, DCI for activation, and DCI for deactivation. SL CG-RNTI may be used to address to the DCI sent by the network/BS/gNB used for the above purposes.

Autonomous Retransmission of Same TB

In some embodiments, if after the last retransmission, the UE detects a NACK at predefined timing for the last transmission of the TB or the UE does not receive an ACK after a specified time T1 (where T1 may be configurable), the UE automatically retransmits the same TB. In some embodiments, the autonomous retransmission may start at a resource with a predefined or (pre)configured time gap after receiving the HARQ NACK feedback. In some embodiment, such as in CG transmission, the autonomous retransmission may be using the next available resource within the configured resources (e.g. SL CG resources (for example during a next time period that is defined based on time domain offset and periodicity)).

In some embodiments, if no ACK/NACK is detected for a TB at predefined/configured timing T4 for HARQ feedback, the UE concludes that the TB was not successfully received, and begins an autonomous retransmission of the TB. Each autonomous retransmission may be a single retransmission or a number of autonomous retransmissions of the same TB. For example, in a SL CG transmission, if a total of 4 transmissions, including the initial transmission and three retransmissions are configured for a TB, the UE may perform another 4 retransmissions (i.e., retransmission numbers 4 to 7) of the TB at the resources within the CG configuration. Accordingly, the previously described early termination procedure may also be applied to the retransmission of the TB. That is, any of retransmission numbers 4 to 7 may be early terminated in response to a received ACK.

Alternatively, if no ACK/NACK is detected for a TB at predefined timing T4 for HARQ feedback or after a predefined/configured timing T5 (from the initial transmission or the last retransmission), the UE concludes successful transmission, and stops performing autonomous retransmission. In some embodiments, T4 and/or T5 may be configured or preconfigured, e.g., in a CG configuration. In some embodiments, the behavior of the UE to conclude unsuccessful or successful transmission in the absence of ACK/NACK is configurable by the network.

In some embodiment, the maximum sets of TB retransmissions may be (pre)configured. For example, in the case of CG where a set of 4 transmissions for each TB (1 initial transmission and 3 retransmissions) are configured, there may be configured some maximum (e.g., 3 sets) number of TB retransmissions. Thus, at the end of the $1^{st}$ and $2^{nd}$ sets of TB retransmissions, the transmit UE will retransmit the TB if it receives a NACK from the receive UE; however, at the end of the $3^{rd}$ set of the TB retransmission (of a configured maximum of 3), the transmit UE will not retransmit the TB if it receives a NACK.

Network (gNB) Triggered Retransmission

In addition to the retransmission procedure of the previous embodiments, the base station (some network entity device or gNB) can schedule an additional retransmission to the UE by sending an explicit scheduling grant for the retransmission. UE should follow the resources specified in the scheduling grant to do a retransmission. In some embodiments, the scheduling grant can also be used to terminate the previously-configured retransmissions. For example, if a UE still has some previously-configured retransmissions to be performed but receives a scheduling grant for a retransmission of the same TB, the UE may terminate the previously-configured retransmissions and perform a retransmission according to the scheduling grant.

A benefit of terminating a previously-configured retransmission in favor of a network-scheduled retransmission is that the network can dynamically schedule dedicated resources to (e.g., temporarily) avoid a potential collision with other transmission.

In some embodiments, the transmit UE can request the network (for example a gNB) to schedule a retransmission from the transmit UE to the receive UE. This may, for example, be triggered following failure to successfully transmit using existing configured CG resources, for example following receipt of some number of NACKs or number of unsuccessful transmissions or number of K repetitions if K repetitions are configured. The number of NACKs N may be predefined or configured/preconfigured to the UE. The number may be configured in a RP. The number may be configured in RRC signaling, system information (e.g. in SIB) or preconfigured. For SL CG transmission, the number of NACKs may be configured in the SL CG configuration. Alternatively, this can be triggered by some other SL measurement satisfying a condition, such as an RSRP measurement, RSRQ, RSSI, CQI feedback satisfying a condition, e.g., if the SL-RSRP measurement obtained from the receive UE indicates the channel quality between the transmit UE and receive UE is poor, the transmit UE may request a retransmission to the network.

In some embodiments, this request is transmitted on a PUCCH at a predefined timing after a SL CG transmission. In some embodiments, the request may be sent as a form of scheduling request (SR). The gNB can reschedule a retransmission of the SL transmission by specifying a retransmission resource in a DCI. If SL CG transmission is used for the first transmission, the DCI may be addressed to the CG-RNTI. To associate the DCI with the specific SL CG transmission, the DCI may include a HARQ process ID or may be transmitted at predefined timing with respect to the request.

Alternatively, a receive UE may request a retransmission of a TB directly to the network, for example by sending the request to a gNB. The request can be triggered by conditions dependent on the number of NACK feedback, RSRP measurement etc., as with the conditions described for the transmit UE.

Flexible Starting Position

In some embodiments, for sidelink CG transmission, after a UE is configured with resources for an initial SL transmission and SL retransmissions, the UE may start an initial SL transmission at a resource originally assigned for SL retransmission. In one embodiment, UE may start an initial SL transmission at any of the configured resource, including the resources used for SL retransmission after those configured for initial SL transmission. These embodiments may be combined with any of the embodiments described herein that enable early termination of retransmission. However, alternatively, these embodiments may be implemented independently of the embodiments described herein that enable early termination of retransmission.

In some embodiments, the retransmissions in respect of the initial transmission that is sent using retransmission resources can also be terminated early by an ACK from the receive UE, using any one of the methods described herein.

For the purpose of this embodiment, the resources for the initial SL transmission and K-1 additional retransmissions, where K is a configured/preconfigured number, fall within one period of CG resources defined by the periodicity and offset in CG configuration for a TB transmission. After the UE makes an initial SL retransmission in one of the resources configured for SL retransmissions, the UE may continue retransmission until K retransmissions are finished. In this case, the K retransmissions may extend to the next period for TB transmission. Alternatively, the retransmissions may be stopped at the end of the current period, in which case less than K retransmissions are performed.

In some embodiments, the UE is allowed to use the retransmissions resource for initial transmission of a new TB only if a certain constraint is satisfied. Various examples will now be described, which can be used alone or in combination.

In some embodiment, whether UE is allowed to use retransmission resource for initial transmission depends on the redundancy version of the transmission or the RV sequence in the configuration. For example, it may only be allowed to be used for a certain RV that is mapped to the resources, e.g. RV0.

In a some embodiments, the UE can use the retransmission resource for initial transmission of a next TB when the UE receives an ACK before finishing all retransmissions for the current TB.

In a some embodiments, the UE can use the retransmission resource for initial transmission of a next TB when retransmission is terminated by the network, for example by a gNB or terminated by the transmit UE after receiving an HARQ ACK.

In some embodiments, the UE can use the retransmission resource for initial transmission of a next TB, when the UE has multiple packets to transmit and decides to transmit a new packet first while waiting for an ACK/NACK of the previous packet.

Where the UE transmits an initial transmission for a next TB in retransmission resources for the current TB, the UE transmits an indication, in some form, that it is an initial transmission. For example, the UE may include a new data indication (NDI) is included in an SCI. Alternatively, a demodulation reference symbol (DMRS) may be transmitted that can be used to identify the new transmission (in which case different DMRS are assigned for an initial transmission and retransmission).

In some embodiment, the HARQ process ID, RV and NDI are also indicated in SCI. The receive UE can rely on SCI decoding to obtain HARQ process ID, RV and NDI information to do HARQ combining. In another embodiment, there is no SCI transmitted for SL transmission (e.g. for SL CG transmission), UE may rely on DMRS detection to identify the starting location of the initial transmission.

Use of SCI for Information Other than Scheduling Information

In some instances, although configured grant transmission may generally work without SCI, in some embodiments, a SCI format that does not indicating scheduling information (for example not including information such as specific time frequency resources, MCS) is used. The SCI can include other information such as one or a combination of: destination ID, source ID, HARQ process ID, NDI, and RV, or other information that is not related to scheduling. If a UE decodes such an SCI, the UE can obtain the destination ID and verify if it is targeted to the UE itself. This can be used to reduce the amount of blind detection of data, since the UE need not perform the blind detection if the transmission is not for the UE itself. The source ID may be useful for HARQ feedback. HARQ process ID, NDI, RV can be used for HARQ procedure.

In some embodiments, if no SCI available or a reduced SCI is available that does not include HARQ information, the following mechanism may be used to determine HARQ process ID, NDI, and RV. The NDI and RV can be associated with the transmission pattern. The first location of the transmission pattern may be corresponding to a new transmission, the other locations of the pattern may be corresponding to retransmission. If flexible starting location is supported as described above, DMRS can be indicate whether it is new transmission or retransmission, i.e. to indicate NDI. For example, different DMRS are configured and mapped to new transmission and retransmissions. RV can be indicated using a configured RV sequence in the resource pool or a predefined RV sequence. Alternatively, DMRS can be used to indicate RV. HARQ process ID can be determined based a mapping between time frequency resource location and HARQ process ID. HARQ process ID may also depends on the periodicity. An example of HARQ process ID would be HARQ process ID=(current slot number)/periodicity mod (maximum number of HARQ process). The maximum number of HARQ processes can be pre-defined or configured in the resource configuration.

If multiple time-frequency resource patterns (TFRP) is configured to a UE, the HARQ process ID can be determined based on both time domain resources and the TFRP index. For example, The HARQ process ID can be calculated as HARQ process ID=(current slot number)/periodicity mod (maximum number of HARQ process*number of TFRPs)+TFRP index. For example, if two TFRP are configured to the UE, each associated with an index 0 or 1 as predefined/configured, e.g. in SL CG configuration. The number of TFRPs is 2 and TFRP index can be 0 and 1 depends on which TFRP is used.

Numerous modifications and variations of the present disclosure are possible in light of the above teachings. It is therefore to be understood that within the scope of the appended claims, the disclosure may be practiced otherwise than as specifically described herein.

The invention claimed is:

1. A method, comprising:

receiving, by a first user equipment (UE) from a base station, a configuration indicating resources for a first set of sidelink (SL) transmissions from the first UE to a second UE, the first set of SL transmissions including an initial SL transmission and a plurality of SL retransmissions;

after the receiving the configuration, transmitting, by the first UE to the second UE, at least one SL transmission of the first set of SL transmissions;

before transmitting a last SL retransmission of the plurality of SL retransmissions receiving, by the first UE from the second UE, an acknowledgement (ACK) for the at least one SL transmission; and terminating, by the first UE, transmission of the first set of SL transmissions in response to receiving the ACK by refraining from transmitting at least the last SL retransmission of the plurality of SL retransmissions.

2. The method of claim 1, wherein the transmitting the initial SL transmission comprises:

transmitting SL control information; and transmitting an initial transmission of SL data, wherein the SL control information indicates the resources for the first set of SL transmissions.

3. The method of claim 1, further comprising:

receiving, by the first UE, a configuration of a resource pool; and selecting, by the first UE, the resources for the first set of SL transmissions from the resource pool.

4. The method of claim 1, wherein the first set of SL transmissions is an SL configured grant (CG) transmission, and wherein the configuration indicates a maximum number of transmissions and retransmissions of a transport block (TB) that the first UE can perform using resources configured by the SL CG transmission.

5. The method of claim 1, wherein a set of periodic physical resources is available for the second UE to transmit the ACK, and wherein the ACK is received using a first available resource from the set of periodic physical resources that occurs later by at least a defined time gap than a time of successful reception of one of the SL retransmissions by the second UE.

6. The method of claim 1, wherein each of the at least one SL transmission is a groupcast transmission to a group of UEs including the second UE, the method further comprising:

transmitting all of the first set of SL transmissions when no ACK is received from at least one UE of the group of UEs; or transmitting fewer than all of the first set of SL transmissions when an ACK is received from all of the group of UEs before all of the first set of SL transmissions has been completed.

7. An apparatus, comprising:

at least one processor; and a non-transitory computer readable storage medium storing programming, the programming including instructions that, when executed by the at least one processor, cause the apparatus perform operations, the operations comprising:

receiving, from a base station, a configuration indicating resources for a first set of sidelink (SL) transmissions from the apparatus to a second apparatus, the first set of SL transmissions including an initial SL transmission and a plurality of SL retransmissions;

after the receiving the configuration, transmitting, to the second apparatus, at least one SL transmission of the first set of SL transmissions from a first apparatus;

before transmitting a last SL retransmission of the plurality of SL retransmissions, receiving, from the second apparatus, an acknowledgement (ACK) for the at least one SL transmission; and terminating transmission of the first set of SL transmissions in response to receiving the ACK by refraining from transmitting at least the last SL retransmission of the plurality of SL retransmissions.

8. The apparatus of claim 7, wherein the transmitting the initial SL transmission comprises:

transmitting SL control information; and transmitting an initial transmission of SL data, wherein the SL control information indicates the resources for the first set of SL transmissions.

9. The apparatus of claim 7, the operations further comprising:

receiving a configuration of a resource pool; and selecting the resources for the first set of SL transmissions from the resource pool.

10. The apparatus of claim 7, wherein the first set of SL transmissions is an SL configured grant (CG) transmission, and wherein the configuration indicates a maximum number of transmissions and retransmissions of a transport block (TB) that the apparatus can perform using resources configured by the SL CG transmission.

11. The apparatus of claim 7, wherein a set of periodic physical resources is available for the second apparatus to transmit the ACK, and wherein the ACK is received using a first available resource from the set of periodic physical resources that occurs later by at least a defined time gap than a time of successful reception of one of the SL retransmissions by the second apparatus.

12. The apparatus of claim 7, wherein each of the at least one SL transmission is a groupcast transmission to a group of apparatuses including the second apparatus, the operations further comprising:

transmitting all of the first set of SL transmissions when no ACK is received from at least one apparatus of the group of apparatuses; or transmitting fewer than all of the first set of SL transmissions when an ACK is received from all of the group of apparatuses before all of the first set of SL transmissions has been completed.

13. The method of claim 4, wherein the resources configured by the SL CG transmission comprise resources in at least a first period of resources and a second period of resources, and wherein the first period of resources are for the first set of SL transmissions, and the second period of resources are for a second set of SL transmissions from the first UE to the second UE.

14. The method of claim 1, wherein the configuration is received using a downlink control information (DCI) signaling.

15. The method of claim 1, wherein the at least one SL transmission is an SL transmission immediately preceding the ACK, and wherein the refraining from transmitting at least the last SL retransmission comprises:

refraining from transmitting one or more SL transmissions of the first set of SL transmissions after the SL transmission immediately preceding the ACK.

16. The method of claim 1, further comprising:
receiving, by the first UE from the second UE, an ACK or a negative acknowledgement (NACK) for each SL transmission of the at least one SL transmission.

17. The apparatus of claim 10,
wherein the resources configured by the SL CG transmission comprise resources in at least a first period of resources and a second period of resources, and
wherein the first period of resources are for the first set of SL transmissions, and the second period of resources are for a second set of SL transmissions from the apparatus to the second apparatus.

18. The apparatus of claim 7, wherein the configuration is received using a downlink control information (DCI) signaling.

19. The apparatus of claim 7, wherein the at least one SL transmission is an SL transmission immediately preceding the ACK, and wherein the refraining from transmitting at least the last SL retransmission comprises:
refraining from transmitting one or more SL transmissions of the first set of SL transmissions after the SL transmission immediately preceding the ACK.

20. The apparatus of claim 7, further comprising:
receiving, from the second apparatus, an ACK or a negative acknowledgement (NACK) for each SL transmission of the at least one SL transmission.

* * * * *